United States Patent [19]

Kamioka et al.

[11] Patent Number: 5,659,532
[45] Date of Patent: Aug. 19, 1997

[54] OPTICAL SCANNING APPARATUS WITH POLYGON MIRRORS REFLECTING LIGHT BEAM AT A CONSTANT SPEED LARGER THAN Dθ/DT

[75] Inventors: Makoto Kamioka, Kasuga; Yoshihiro Gotou, Chikushino, both of Japan

[73] Assignee: Matsushita Electric Industrial Co., Ltd., Japan

[21] Appl. No.: 512,015

[22] Filed: Aug. 7, 1995

[30] Foreign Application Priority Data

Aug. 15, 1994 [JP] Japan .................................. 6-191416
Oct. 31, 1994 [JP] Japan .................................. 6-267159

[51] Int. Cl.$^6$ .............................. G02B 26/00; G11B 7/00
[52] U.S. Cl. .......................... 369/112; 369/119; 359/206; 359/216
[58] Field of Search .................................. 369/112, 119; 359/205, 206, 216, 218

[56] References Cited

U.S. PATENT DOCUMENTS

| | | | |
|---|---|---|---|
| 5,086,350 | 2/1992 | Nishihata | 359/206 |
| 5,105,296 | 4/1992 | Cho et al. | 359/216 |
| 5,179,465 | 1/1993 | Kondo | 359/206 |
| 5,233,455 | 8/1993 | Yamaguchi et al. | 359/205 |

*Primary Examiner*—Georgia Y. Epps
*Assistant Examiner*—Kim-Kwok Chu
*Attorney, Agent, or Firm*—Rossi & Associates

[57] ABSTRACT

An optical beam scanning apparatus comprises: an beam source emitting an optical beam; a deflector deflecting the optical beam around a center line with a deflection angle θ radians in a main scanning direction perpendicular to the center line at a constant angular velocity dθ/dt; a lens system, having a focal length f in the main scanning direction, for focusing the optical beam on a recording plane perpendicular to the center line to form and scanning a beam spot on the recording plane at a constant speed in the main scanning direction, wherein the lens system refracts the optical beam from the deflection means such that the constant speed is larger than f·dθ/dt. An emitting angle from the lens system is larger than the deflection angle by the deflector. The deflector comprises a polygon mirror unit. The lens system may have a function to compensate a surface inclination in the polygon mirror unit. That is, the lens system includes toric surfaces including at least a rotation symmetric aspheric surface and at least a spherical surface or one of the plurality refracting surfaces has a toric surface having an aspheric surface and other refracting surfaces have rotation symmetric aspheric surfaces. A collimating lens unit may be provided between the beam source and the deflector. Units necessary for recording data may be further provided.

16 Claims, 18 Drawing Sheets

$$Z(r) = \frac{H \cdot r^2}{1 + \sqrt{1 - (1+K) \cdot H^2 \cdot r^2}} + A \cdot r^4 + B \cdot r^6 + C \cdot r^8 + D \cdot r^{10}$$

$$r = \sqrt{x^2 + y^2}$$

FIG. 4 PRIOR ART
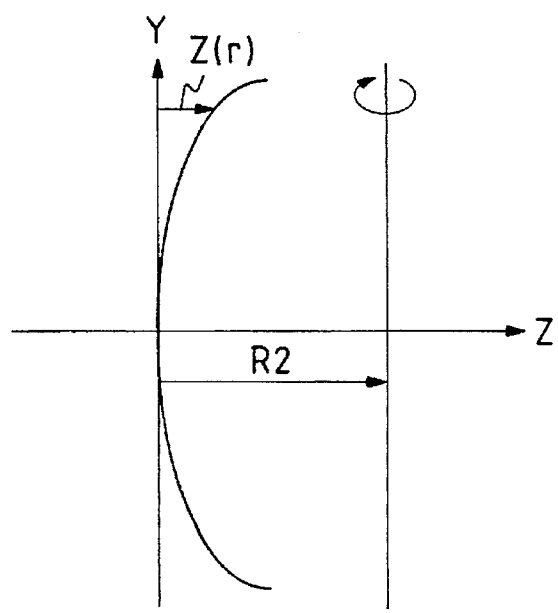
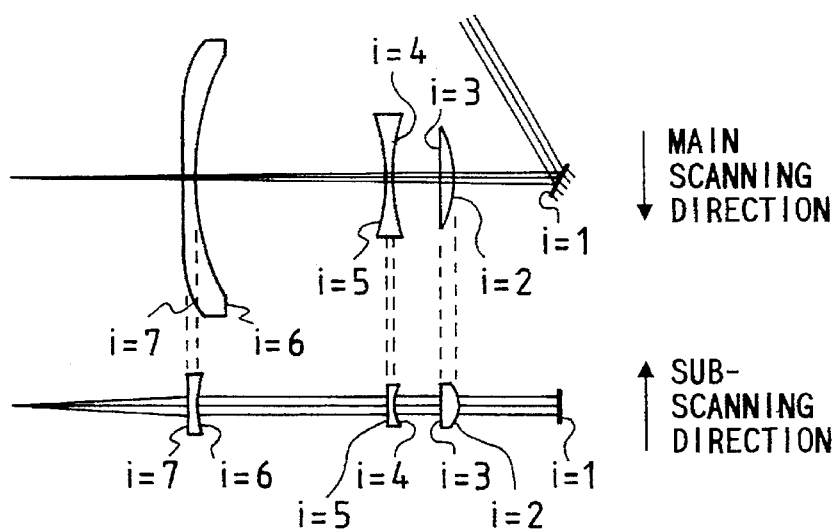
FIG. 7A
FIG. 7B

CURVATURE OF FIELD

2·f·θ CHARACTERISTIC (CONSTANT SPEED CHARACTERISTIC)

CURVATURE OF FIELD $2 \cdot f \cdot \theta$ CHARACTERISTIC (CONSTANT SPEED CHARACTERISTIC)

FIG. 12
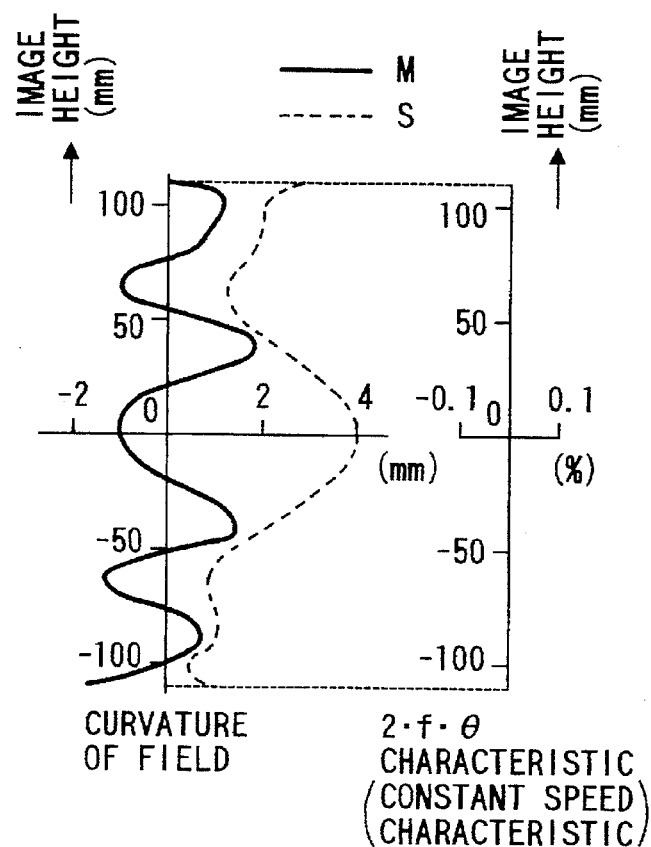
FIG. 13A
FIG. 13B
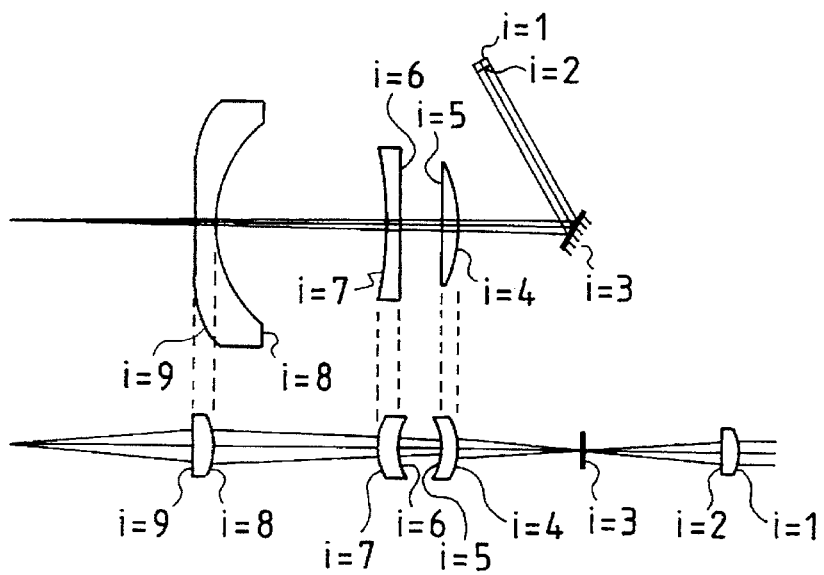

FIG. 14
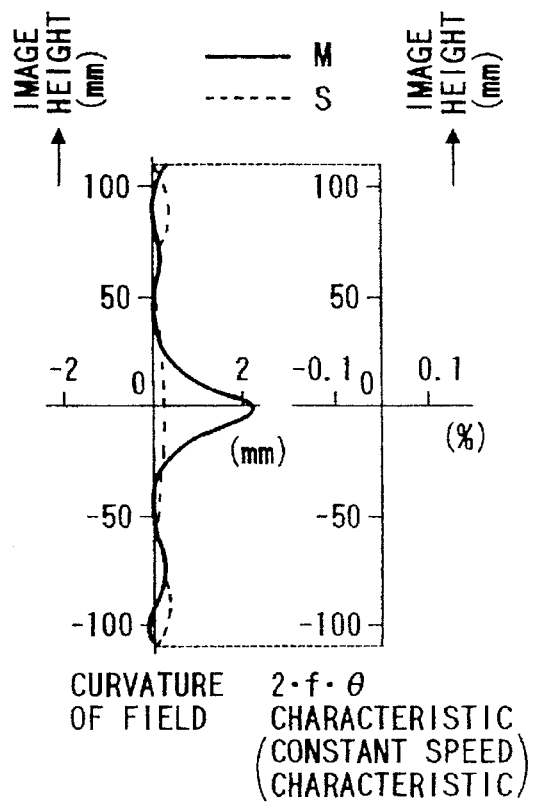
FIG. 15A
FIG. 15B
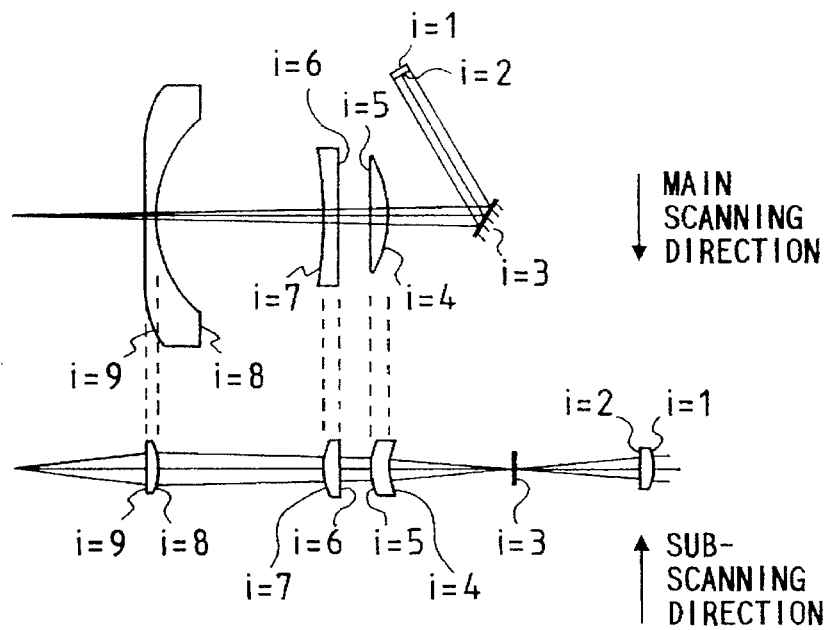

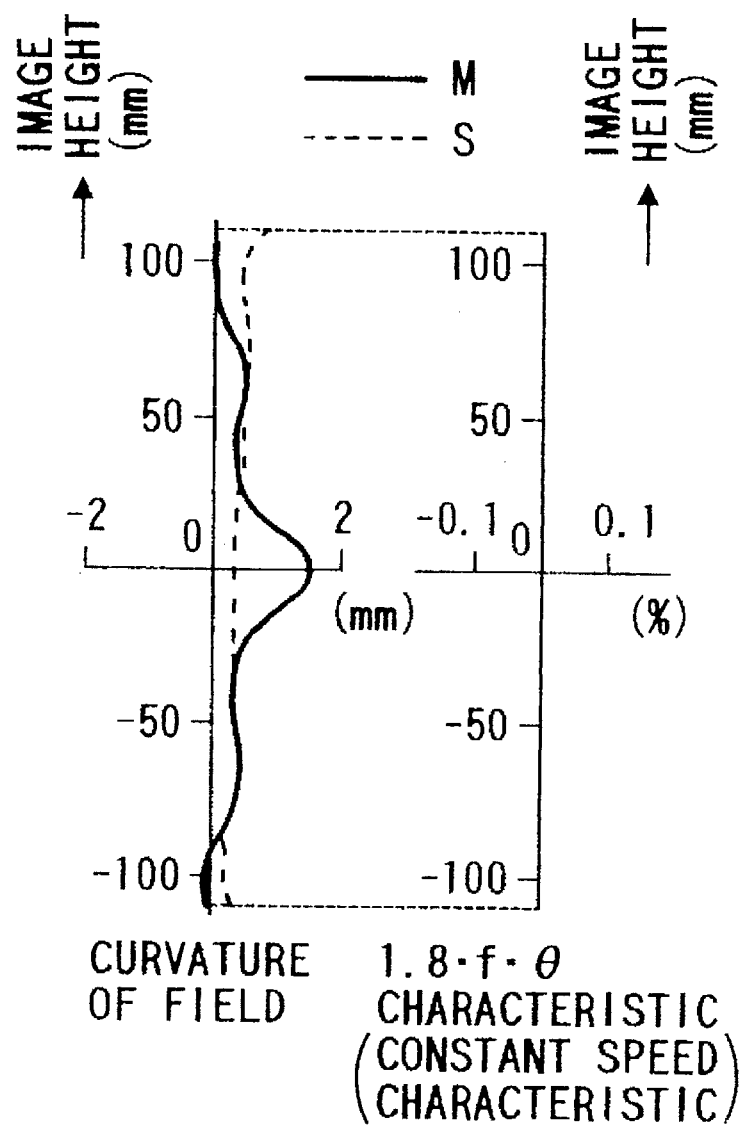

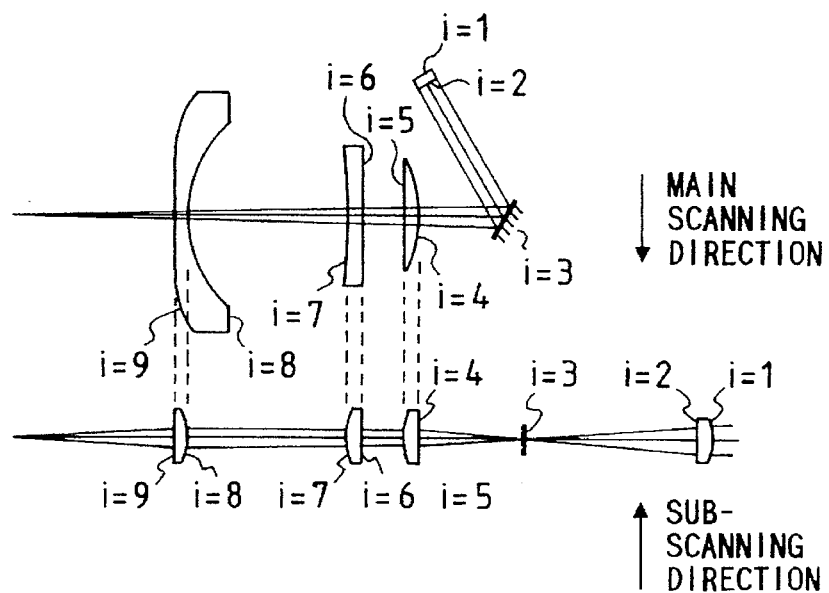
FIG. 19A
FIG. 19B
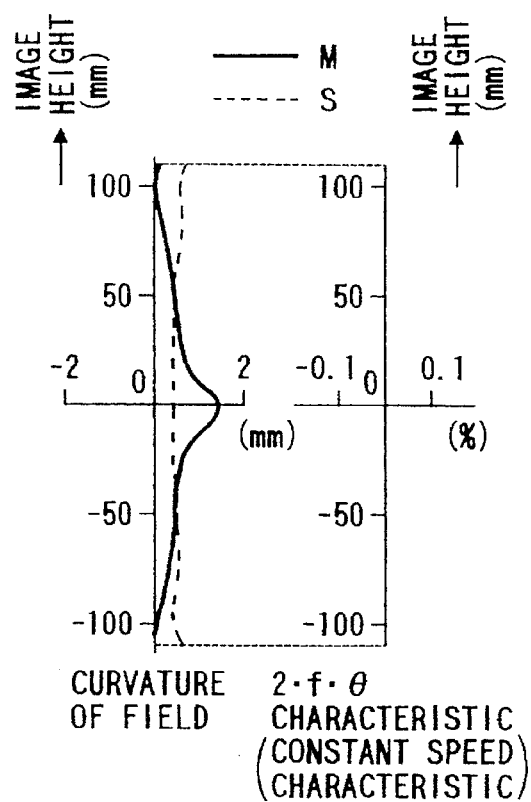
FIG. 20

CURVATURE OF FIELD

CONSTANT SPEED CHARACTERISTIC

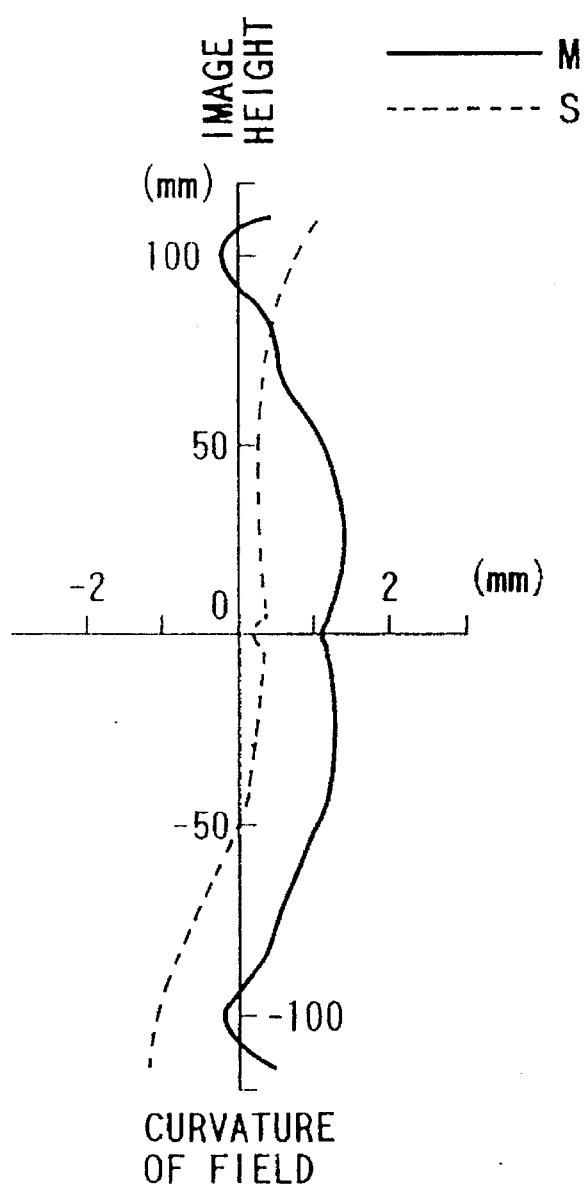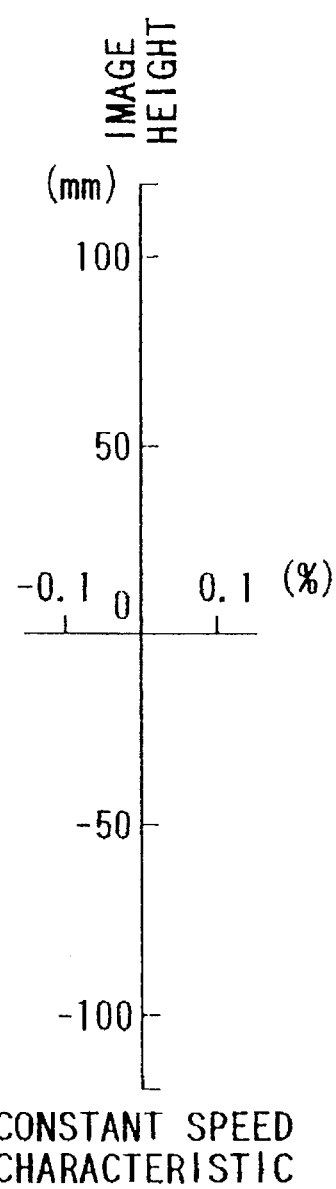
FIG. 24A  CURVATURE OF FIELD
FIG. 24B  CONSTANT SPEED CHARACTERISTIC

CURVATURE OF FIELD

CONSTANT SPEED CHARACTERISTIC

OPTICAL SCANNING APPARATUS WITH POLYGON MIRRORS REFLECTING LIGHT BEAM AT A CONSTANT SPEED LARGER THAN DΘ/DT

BACKGROUND OF THE INVENTION

1. Field of the Invention

This invention relates to an optical beam scanning apparatus for forming an image through scanning of an optical beam.

2. Description of the Prior Art

An optical beam scanning apparatus for forming an image through scanning of an optical beam is known. Such a prior art optical beam scanning apparatus comprises a laser diode for generating a laser beam, a polygon mirror unit for deflecting the laser beam in a main scanning direction, a fθ lens for forming a spot on a recording medium with a constant speed in the main scanning direction and with the spot focused on the recording medium.

FIG. 27 is a schematic plan view of a prior art optical beam scanning apparatus. This prior art optical beam scanning apparatus comprises a laser diode 1 for generating a laser beam, a collimeter lens 2 for collimating the laser beam, a cylindrical lens 3 for focusing the laser beam on a mirror surface of the polygon mirror only in the sub-scanning direction, a polygon mirror unit 4 for deflecting the laser beam in a main scanning direction, a fθ lens system 6 for forming a spot on a recording medium with a constant speed in the main scanning direction and with the spot focused on the recording medium. FIG. 28 is a graphic diagram of an aberration characteristic of a prior art general lens and a prior art fθ lens. In the general lens, a height of a formed image from an optical axis varies with an incident angle of the image non-linearly. The fθ lens compensates this change linearly.

Assuming the laser beam is directed by the polygon mirror with a deflection angle θ and emitted at the final surface of the fθ lens system with an emission angle α, the scanning speed on the recording medium is constant, that is, f·dθ/dt and the emission angle α is less than the deflection angle θ.

SUMMARY OF THE INVENTION

The aim of the present invention is to provide an improved optical beam scanner.

According to this invention, there is provided a first optical beam scanning apparatus comprising: an optical beam source for emitting an optical beam; a deflection portion for deflecting the optical beam around a center line with a deflection angle θ radians in a main scanning direction perpendicular to the center line at a constant angular velocity dθ/dt; a lens system, having a focal point of length f in the main direction, for focusing the optical beam on a recording plane perpendicular to the center line to form and scan a beam spot on the recording plane at a constant speed in the main scanning direction, wherein the lens system refracts the optical beam from the deflection portion such that the constant speed is larger than f·dθ/dt.

According to the present invention there is also provided a second optical beam scanning apparatus comprising: an optical beam source for emitting an optical beam; a deflection portion for deflecting the optical beam around a center line with a deflection angle in a main scanning direction perpendicular to the center line; a lens system, having a focal length f in the main scanning direction, for emitting the optical beam with an emission angle defined by the center line and focusing and forming the optical beam on a recording plane perpendicular to the center line at a constant speed in the main scanning direction, wherein the emission angle is larger than the deflection angle at any instance except on said center line.

In the first and second optical beam scanning apparatus, the deflection portion has a plurality of deflecting mirrors. The plurality of deflecting mirrors have an inclined angle against the recording plane and generates a positional offset in a sub-scanning direction perpendicular to the main scanning direction but the lens system has a compensation portion for compensating the positional offset.

The first or second optical beam scanning apparatus, further comprises a second lens system for shaping and directing the optical beam from the optical beam source to the deflection portion and the second lens system may comprise a collimating lens unit for collimating the optical beam from the optical beam source in the main direction and for focusing the optical beam around the deflection portion in a sub-scanning direction perpendicular to the center line and the main direction.

In the first and second optical beam scanning apparatus, in order to compensate the inclination of surface of deflection unit, the lens system may include a plurality of refracting surfaces having toric surfaces including at least a rotation symmetric aspheric surface and at least a spherical surface. In the first and second optical beam scanning apparatus, the lens system may include a plurality of refracting surfaces and one of the plurality refracting surfaces has a toric surface having an aspheric surface and other refracting surfaces have rotation symmetric aspheric surfaces.

The first or second optical beam scanning apparatus may further comprise a sub-scanning portion for relatively moving a recording medium in the sub-scanning direction, a signal processing portion for receiving a data signal and producing an image signal, and a modulation portion for modulating the optical beam source supplied to the deflecting portion to record the image signal on the recording medium.

According to the above-mentioned structure, a deflection angle range of the deflection portion can be made relatively smaller to obtain the same scanning width. Therefore, the number of the mirrors of the polygon mirror unit can be increased. Accordingly, the scanning speed can be increased with the same rotation speed of the polygon mirror unit.

BRIEF DESCRIPTION OF THE DRAWINGS

The object and features of the present invention will become more readily apparent from the following detailed description taken in conjunction with the accompanying drawings in which:

FIG. 4 is a graphic diagram of a prior art YTO aspheric surface;

FIG. 7A is a plan view of a second optical system and a polygon mirror of a first embodiment;

FIG. 7B is a side view of the second optical system and the polygon mirror of the first embodiment;

FIG. 12 is a graphic diagram of aberration characteristics of the third embodiment;

FIG. 13A is a plan view of a second optical system and a polygon mirror of a fourth embodiment;

FIG. 13B is a side view of the second optical system and a polygon mirror of the fourth embodiment;

FIG. 14 is a graphic diagram of aberration characteristics of the fourth embodiment;

FIG. 15A is a plan view of a second optical system and a polygon mirror of a fifth embodiment;

FIG. 15B is a side view of the second optical system and a polygon mirror of the fifth embodiment;

FIG. 16 is a graphic diagram of aberration characteristics of the fifth embodiment;

FIG. 19A is a plan view of a second optical system and a polygon mirror of a seventh embodiment;

FIG. 19B is a side view of the second optical system and a polygon mirror of the seventh embodiment;

FIG. 20 is a graphic diagram of aberration characteristics of the seventh embodiment;

FIG. 24 is a graphic diagram of aberration characteristics of the ninth embodiment;

The same or corresponding elements or parts are designated with like references throughout the drawings.

DETAILED DESCRIPTION OF THE INVENTION

Prior to describing respective embodiments, a general structure and operation of this invention will be described.

Figures 1A, 1B:
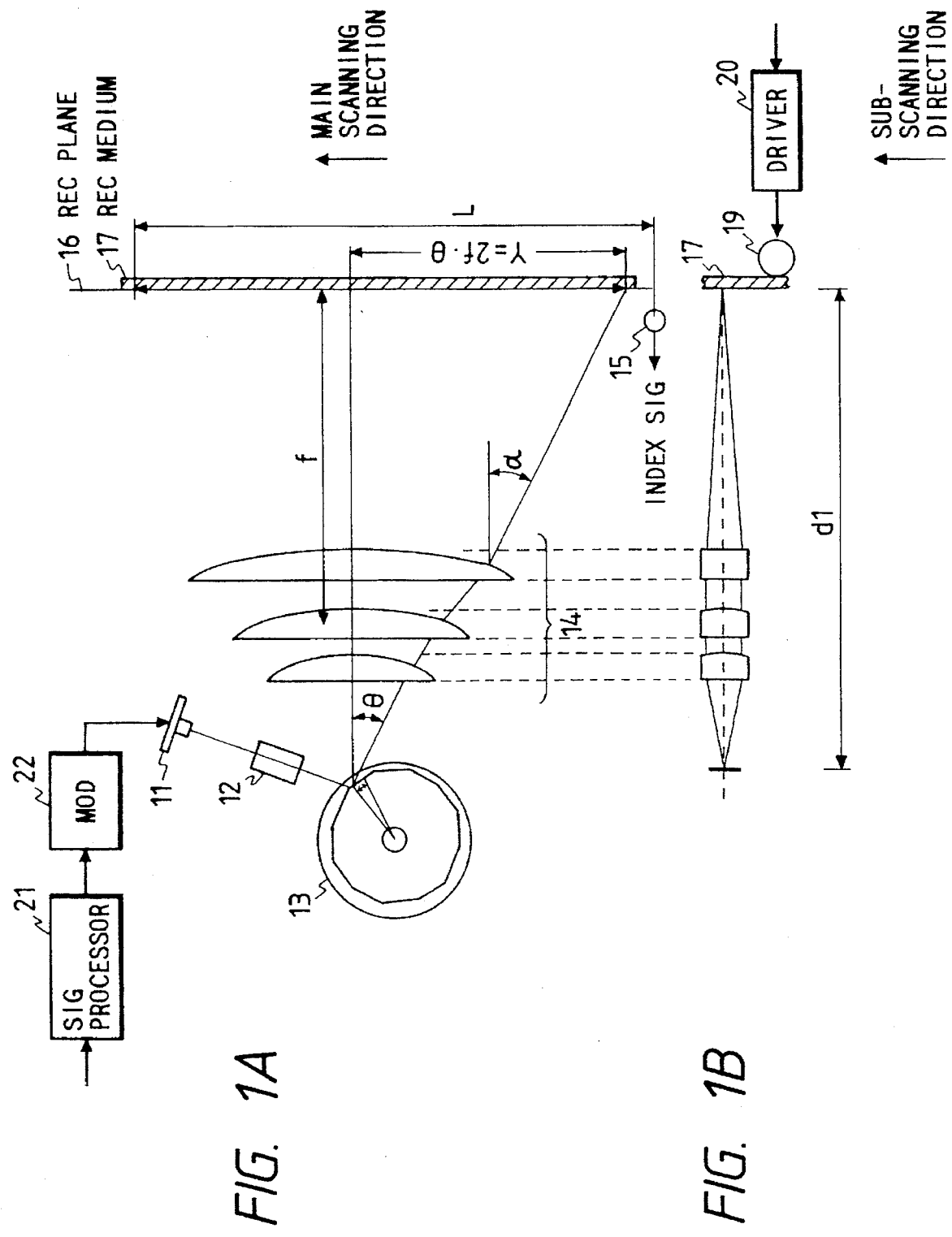
FIG. 1A is a plan view of an optical beam scanning apparatus of this invention.
FIG. 1B is a side view of the optical beam scanning apparatus of this invention.

FIG. 1A is a plan view of an optical beam scanning apparatus of this invention and FIG. 1B is a side view of the optical beam scanning apparatus of this invention. An optical beam source 11 having a semiconductor laser or the like emits a (laser) beam. A first optical system 12 shapes the beam from the optical beam source 11. A deflection unit 13, having a polygon mirrors or the like, deflects the beam from the first optical system. A second optical system 14 directs the beam deflected by the deflection unit 13 toward a recording medium 17 i.e., a recording plane 16, to form a beam spot on the recording medium 17 such that assuming the deflected beam has a deflection angle θ from an optical axis of the second optical system and the second optical system has a focal length f in the main scanning direction, a constant scanning speed, i.e. a speed of the beam spot in the main scanning direction, is larger than f·dθ/dt or an emission angle α of the beam from the second optical system defined by the optical axis of the second optical system 14 is larger then the deflection angle θ. An index signal generator 15 receives the beam from the second optical system 14 and generates an index signal used for a synchronizing operation.

The optical beam scanning apparatus of this invention further comprises a signal processing circuit for receiving a data signal and producing an image signal, a modulation circuit 22 for producing a modulation signal in accordance with the image signal. The optical beam source 11 emits the laser light modulated in accordance with the image signal. The recording medium 17 set on the recording plane 16 is relatively moved in the sub-scanning direction perpendicular to the main scanning direction to form the image on the recording medium 17.

In this invention, the number of mirrors of the defector 13 is relatively increased to increase the scanning speed of the beam at the same rotational speed of the deflection unit 13 and the second optical system 14 is made such that the length L of a significant scanning region in the main scanning direction is with a small maximum deflection angle compared with the conventional optical beam scanning apparatus. In other words, if the conventional optical beams scanning apparatus deflects the beam over the length L with the same distance d1 between the deflection point to the recording medium 17 using M mirrors (M is a natural number), the scanning speed is f·dθ /dt. On the other hand, this optical beam scanning apparatus uses M+I mirrors and the second optical system scans the beam at a scanning speed which is (M+I)/M times f·dθ/dt.

FIGS. 1A and 1B show the case that M=6 and I=6. That is, the number of the scanning per unit interval is twice that of the conventional optical beam scanning apparatus. Therefore, the second optical system 14 provides the scanning speed 2·dθ/dt. In other words, this second optical system provides the number of scanning per a unit interval twice with the rotational speed of the polygon mirror unit 13 unchanged with the number of the mirrors of the deflection unit 13 made twice. Moreover, if the M=5 and the I=4, the second optical system 14 should have a function that the constant scanning speed V=1.8·f·dθ/dt.

Moreover, the optical beam scanning apparatus of this invention has a surface inclination (tilt) compensation function of the polygon mirror unit 13 in the first optical system 12 or the second optical system 14 using surface curves of lenses. The surface inclination is inclination of a surface(s) of the deflection unit in the sub-scanning direction.

Then, the notation of the lens surface curvature will be described. In this specification, it is assumed that i is a natural number and represents a lens surface and R1 represents a radius of curvature in the main direction (in parallel to the scanning direction) and R2 represents a radius of curvature in the sub-scanning direction (in the direction perpendicular to the scanning direction), Dis represents an interval between the i surface and (i+1) surface, and N represents a refractive index. If a radius of curvature of R1 or R2 is represented by INF (INFINITY) this represents that the radius of curvature is infinite. Moreover, plus signs of R1, R2, and DIS represent beam transmitting directions thereat and minus signs represent opposite directions to the beam transmitting direction.

Then, shapes of lens surfaces will be described. The shapes of the lens surfaces are classified into a flat surface, a reflective surface, a spherical surface, a cylindrical surface, a rotation symmetrical aspheric surface, a YTO surface (Y toric surface), a XTO surface, a YTO aspheric surface, and a XTO aspheric surface. Then, the flat surface is represented such that it has an infinite radius of curvature in the R1 and R2 directions. The reflective surface is assumed to have a minus refractive index. The spherical surface is assumed to have the same radius of curvature in the both R1 and R2 directions. The cylindrical surface is assumed as to have an infinite radius of curvature in either of R1 or R2 direction.

Figure 2:
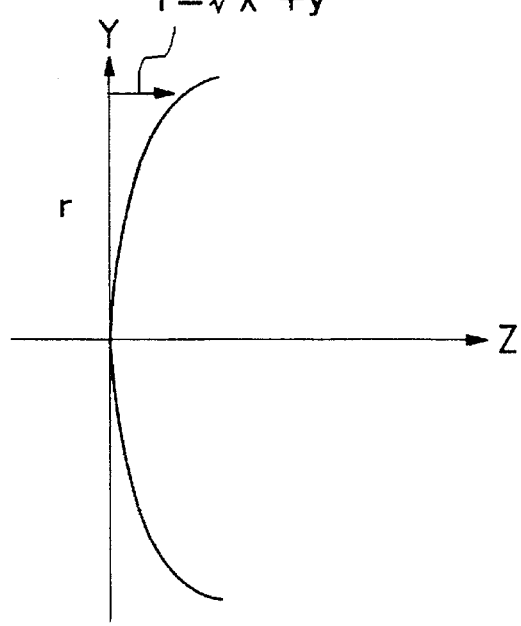
FIG. 2 is a graphic diagram of a curvature of a prior art rotation symmetrical aspheric surface.

FIG. 2 is a graphic diagram of a curvature of a prior art rotation symmetrical aspheric surface. The rotation symmetrical aspheric surface is given by:

$$Z(r) = (H_i \cdot r^2 / T) + A_i \cdot r^4 + B_i \cdot r^6 + C_i \cdot r^8 + D_i \cdot r^{10}$$

where r is a distance in the plane of Z(0) from a peak of the lens (X=0, Y=0, Z=0), $T = 1 + [1-(1+k_i) \cdot H_i^2 \cdot r_i^2]^{1/2}$, $r_i = [X^2 + Y^2]^{1/2}$ and $K_i$, $A_i$, $B_i$, $C_i$, and $D_i$ are aspheric surface coefficients at i surface, and $H_i$ is a radius of curvature of an optical axis at the i surface.

In FIG. 2, the optical axis is assigned to the Z axis and the Y axis is perpendicular to the Z axis and extends in the upward direction in the drawing and X axis (not shown) is also perpendicular to the Z axis and extends in the depth direction in the drawing. Z(r) represents a distance from a lens peak (a position in Z axis when r=0), to a position on Z axis when r is given by $[X^2+Y^2]^{1/2}$. Therefore, determination of $H_i$, $A_i$, $B_i$, $C_i$, and $D_i$ provides a free curvature Z(r). Then, a rotation symmetrical aspheric surface is formed by rotating the free curvature Z(r) around Z axis.

Figure 3:
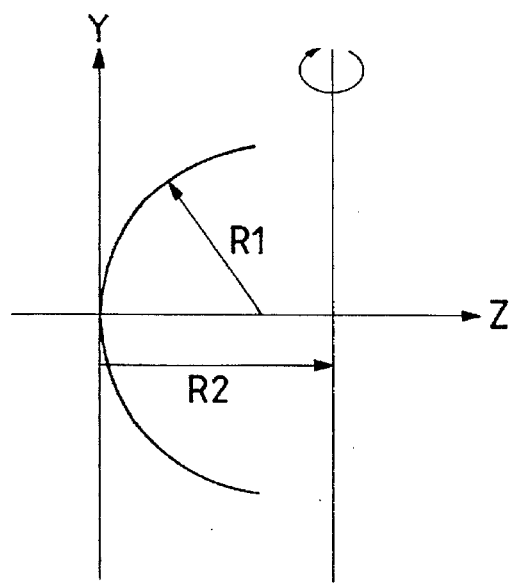
FIG. 3 is a graphic diagram of a prior art curvature providing the YTO surface.

The YTO surface is a toric surface which has different radii of curvatures (not infinite) in X and Y axes. FIG. 3 is a graphic diagram of a prior art curvature providing the YTO surface. As shown in FIG. 3, the YTO surface has a radius of curvature R1 in the main scanning direction (Y axis direction) and a radius of curvature R2 in the sub-scanning direction (perpendicular to Y axis) and is formed by rotating the curvature having the radius R1 on the YZ cross-section around an axis in parallel to Y axis apart from the lens peak in Z axis direction by the distance R2.

FIG. 4 is a graphic diagram of a prior art YTO aspheric surface. As shown in FIG. 4, the YTO aspheric surface is formed by rotating a free curvature Z(r) on YZ cross section, which was used to form the rotation symmetric aspheric surface, around an axis in parallel to Y axis apart from the lens peak by the distance R2 in Z axis.

Figure 5:
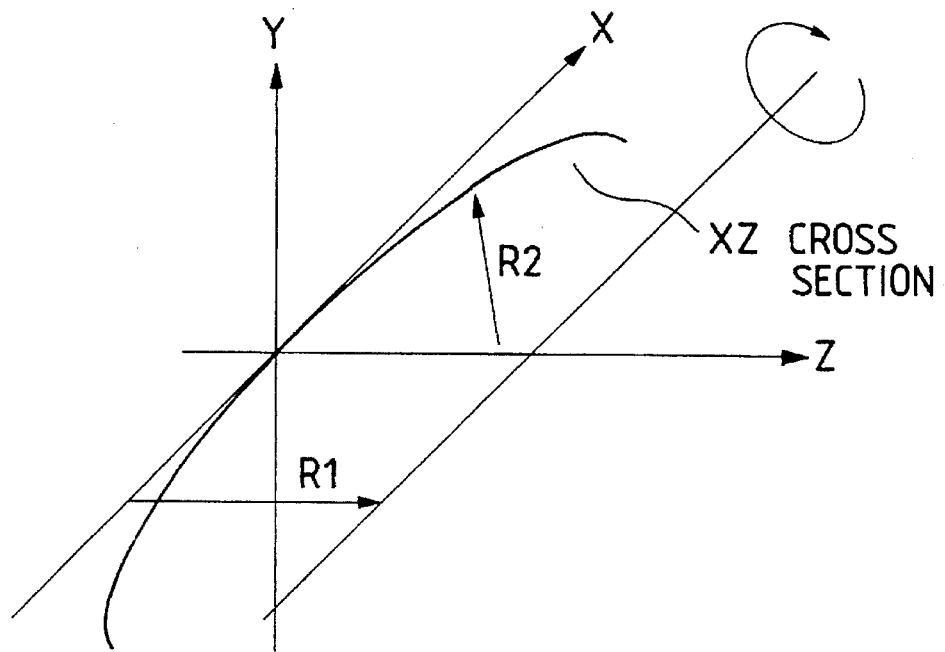
FIG. 5 is a graphic diagram of a prior art curvature providing the XTO surface.

The XTO surface is a toric surface which has different radius of curvatures (not infinite) in X and Y axes. FIG. 5 is a graphic diagram of a prior art curvature providing the XTO surface. As shown in FIG. 5, the XTO surface has a radius of curvature R1 in the main scanning direction (Y axis direction) and a radius of curvature R2 in the sub-scanning direction (perpendicular to Y axis) and is formed by rotating the curvature having the radius R2 on the XZ cross section around an axis in parallel to X axis apart from the lens peak by the distance R1 in the Z axis direction.

Figure 6:
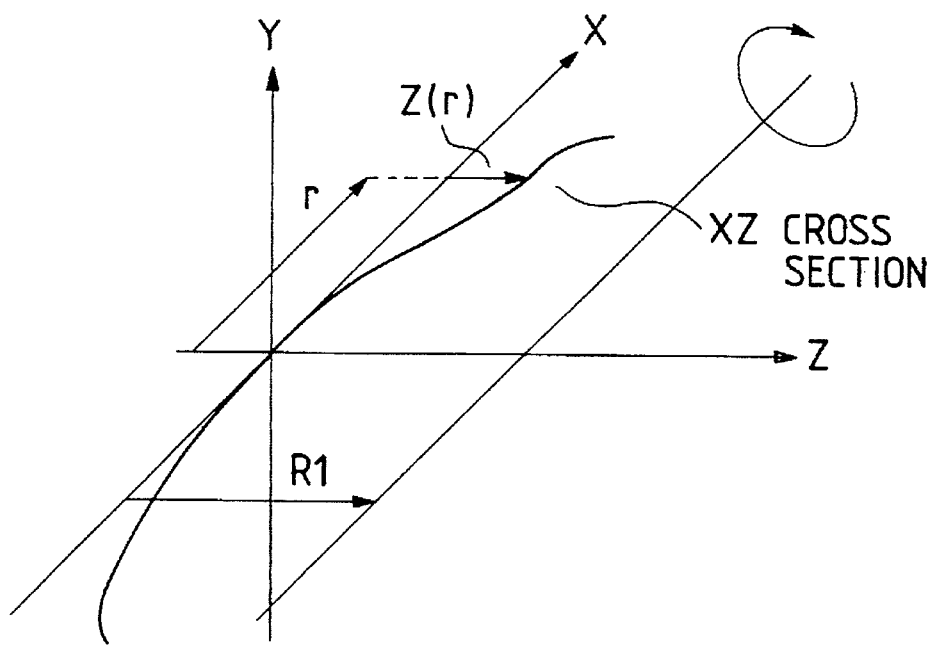
FIG. 6 is a graphic diagram of a prior art XTO aspheric surface.

FIG. 6 is a graphic diagram of a prior art XTO aspheric surface. As shown in FIG. 6, the XTO aspheric surface is formed by rotating a free curvature Z(r) on XZ cross section, which was used to form the rotation symmetric aspheric surface, around an axis in parallel to X axis apart from the lens peak by the distance R1 in Z axis.

A first embodiment will be described.

An optical beam scanning apparatus of the first embodiment has no surface inclination compensation function and has a constant scanning speed $V = 2 \cdot f \cdot d\theta/dt$ and the second optical system has a focal length in the main scanning direction f=135.5 mm. In such a condition, the second optical system is made with data as shown in Tables 1 and 2.

TABLE 1

|  | R1 | R2 | Dis | N | SURFACE |
|---|---|---|---|---|---|
| i = 1 | INF | INF | 53.16 | −1 | FLAT REFLECTION |
| 2 | 68.07 | 68.07 | 9.88 | 1.51922 | SPHERICAL |
| 3 | 28.51 | 28.51 | 20.00 | 1 | ROTATION SYM ASPHERIC |
| 4 | −158.39 | −158.39 | 5.00 | 1.51922 | SPHERICAL |
| 5 | −31.50 | −31.50 | 91.96 | 1 | ROTATION SYM ASPHERIC |
| 6 | −125.25 | −125.25 | 7.00 | 1.51922 | SPHERICAL |
| 7 | −82.71 | −82.71 | 82.04 | 1 | ROTATIOIN SYM ASPHERIC |

TABLE 2

|  | i = 3 | i = 5 | i = 7 |
|---|---|---|---|
| K | −0.42366941 × 10$^{22}$ | −0.31005803 × 10$^{17}$ | −0.1607439 × 10$^{24}$ |
| H | 0.0350711 | −0.0317478 | −0.0120911 |
| A | −0.171278 × 10$^{-3}$ | 0.300159 × 10$^{-5}$ | −0.451002 × 10−5 |
| B | −0.664928 × 10$^{-10}$ | 0.732108 × 10$^{-9}$ | 0.315115 × 10$^{-10}$ |
| C | 0.551621 × 10$^{-12}$ | −0.468796 × 10$^{-12}$ | −0.344305 × 10$^{-14}$ |
| D | −0.195695 × 10$^{-15}$ | 0.767088 × 10$^{-15}$ | 0.405449 × 10$^{-19}$ |

Figure 8:
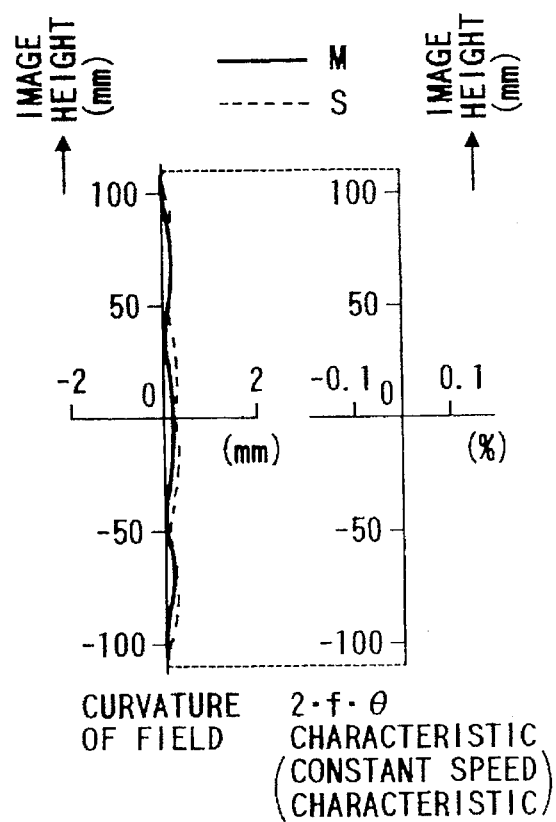
FIG. 8 is a graphic diagram of aberration characteristics of the first embodiment.

FIG. 7A is a plan view of the second optical system and a polygon mirror of the first embodiment. FIG. 7B is a side view of the second optical system and the polygon mirror of the first embodiment. FIG. 8 is a graphic diagram of aberration characteristics (a curvature of field and 2·f·θ characteristic). In FIG. 8, the 2·f·θ characteristic shows errors between the measurement values and theoretical values and M represents the curvature of field in the main scanning direction and S represents the curvature of field in the sub-scanning direction.

A second embodiment will be described.

An optical beam scanning apparatus of the second embodiment has a surface inclination compensation function and has a constant scanning speed $V = 2 \cdot f \cdot d\theta/dt$ and the second optical system has a focal length in the main scanning direction f=135.5 mm. In such a condition, the second optical system is made with data as shown in Tables 3 and 4.

TABLE 3

|  | R1 | R2 | Dis | N | SURFACE |
|---|---|---|---|---|---|
| i = 1 | INF | 44 | 3.00 | 1.51118 | CYLINDRICAL |
| 2 | INF | INF | 84.09 | 1 | FLAT |
| 3 | INF | INF | 61.51 | −1 | FLAT REFLECTION |
| 4 | 78.50 | −43.30 | 7.00 | 1.51922 | YTO |
| 5 | 226.83 | −17.27 | 105.00 | 1 | YTO ASPHERIC |
| 6 | −48.54 | −56.46 | 7.00 | 1.51922 | YTO |
| 7 | −31.63 | −44.05 | 69.49 | 1 | YTO ASPHERIC |

TABLE 4

|   | i = 5 | i = 7 |
|---|---|---|
| K | $-0.28110828 \times 10^{13}$ | $-0.74074514 \times 10^{22}$ |
| H | 0.0044086 | $-0.0316189$ |
| A | $0.648764 \times 10^{-5}$ | $-0.961287 \times 10^{-5}$ |
| B | $-0.258257 \times 10^{-9}$ | $0.146209 \times 10^{-9}$ |
| C | $0.369499 \times 10^{-13}$ | $-0.236406 \times 10^{-13}$ |
| D | $-0.369603 \times 10^{-17}$ | $0.108272 \times 10^{-17}$ |

Figure 9A:
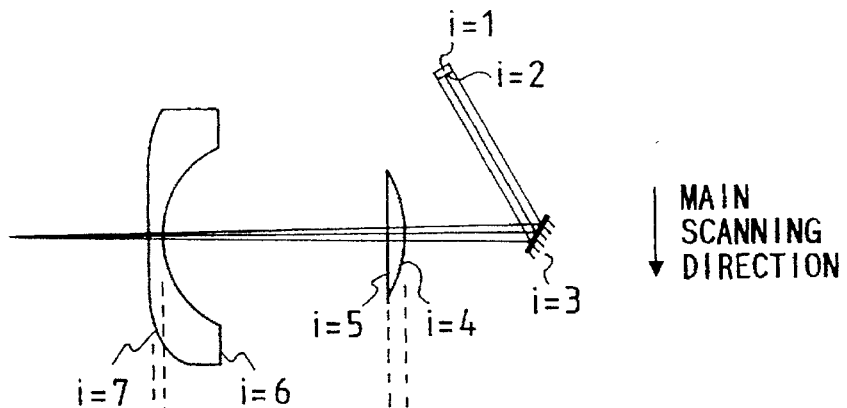
FIG. 9A is a plan view of a second optical system and a polygon mirror of a second embodiment.
Figure 9B:
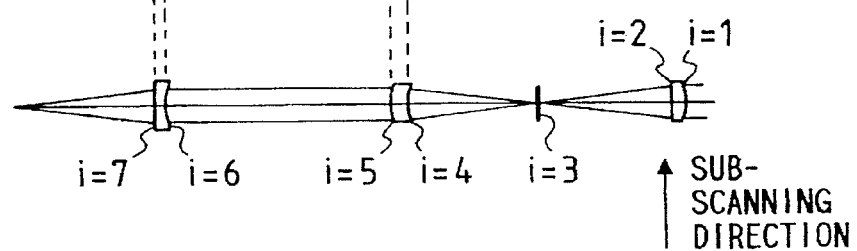
FIG. 9B is a side view of the second optical system and a polygon mirror of the second embodiment.
Figure 10:
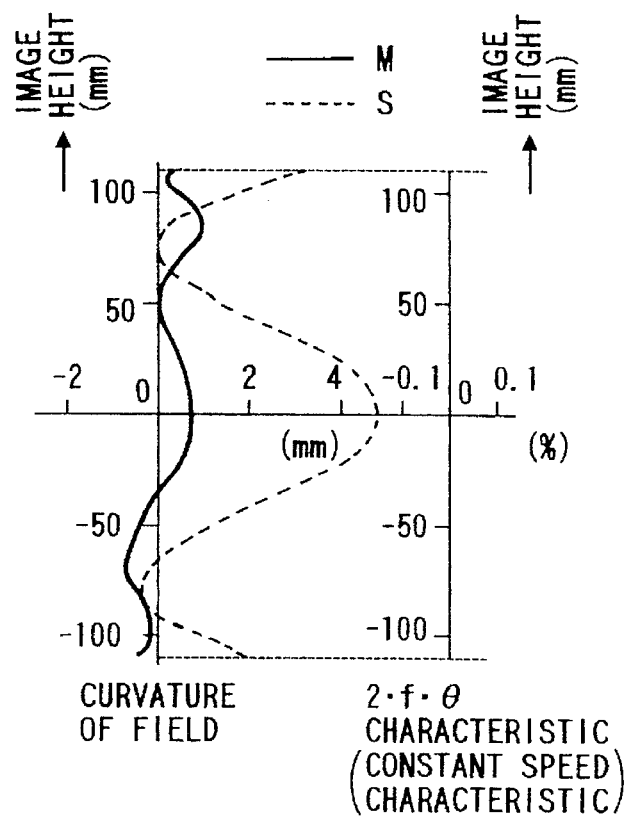
FIG. 10 is a graphic diagram of aberration characteristics of the second embodiment.

FIG. 9A is a plan view of the second optical system and a polygon mirror of the second embodiment. FIG. 9B is a side view of the second optical system and a polygon mirror of the second embodiment. FIG. 10 is a graphic diagram of aberration characteristics (a curvature of field and 2·f·θ characteristic). In FIG. 10, the 2·f·θ characteristic shows errors between the measurement values and theoretical values and M represents the curvature of field in the main scanning direction and S represents the curvature of field in the sub-scanning direction.

A third embodiment will be described.

An optical beam scanning apparatus of the third embodiment has a surface inclination compensation function and has a constant scanning speed V=2·f·dθ/dt and the second optical system has a focal length in the main scanning direction f=135.5 mm. In such a condition, the second optical system is made with data as shown in Tables 5 and 6.

TABLE 5

|   | R1 | R2 | Dis | N | SURFACE |
|---|---|---|---|---|---|
| i = 1 | INF | 44 | 3.00 | 1.51118 | CYLINDRICAL |
| 2 | INF | INF | 84.09 | 1 | FLAT |
| 3 | INF | INF | 52.04 | $-1$ | FLAT REFLECTION |
| 4 | 76.43 | $-38.71$ | 7.00 | 1.51922 | YTO |
| 5 | 137.16 | $-15.67$ | 88.61 | 1 | YTO ASPHERIC |
| 6 | $-61.74$ | $-35.37$ | 6.99 | 1.51922 | YTO ASPHERIC |
| 7 | $-36.29$ | $-31.90$ | 95.35 | 1 | YTO ASPHERIC |

TABLE 6

|   | i = 5 | i = 6 | i = 7 |
|---|---|---|---|
| K | $-0.28110828 \times 10^{19}$ | $-4.504654$ | $-0.74074514 \times 10^{22}$ |
| H | 0.0072907 | $-0.0161962$ | $-0.0275581$ |
| A | $0.140434 \times 10^{-5}$ | $-0.287699 \times 10^{-5}$ | $-0.128841 \times 10^{-5}$ |
| B | $-0.276348 \times 10^{-3}$ | $-0.984182 \times 10^{-9}$ | $-0.278903 \times 10^{-9}$ |
| C | $0.258910 \times 10^{-11}$ | $0.381948 \times 10^{-12}$ | $-0.511961 \times 10^{-13}$ |
| D | $-0.9956 \times 10^{-15}$ | $-0.763353 \times 10^{-15}$ | $0.211465 \times 10^{-16}$ |

Figure 11A:
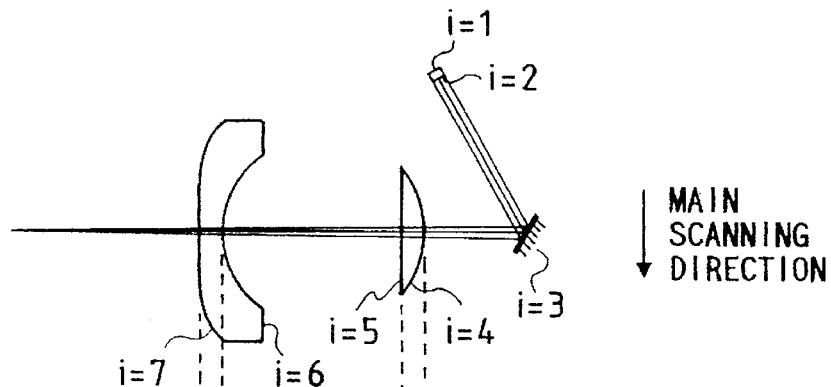
FIG. 11A is a plan view of a second optical system and a polygon mirror of a third embodiment.
Figure 11B:
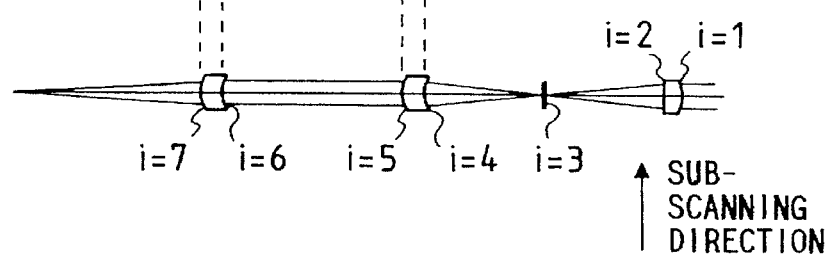
FIG. 11B is a side view of the second optical system and a polygon mirror of the third embodiment.

FIG. 11A is a plan view of the third optical system and a polygon mirror of the second embodiment. FIG. 11B is a side view of the second optical system and a polygon mirror of the third embodiment. FIG. 12 is a graphic diagram of aberration characteristics (a curvature of field and 2·f·θ characteristic). In FIG. 11, the 2·f·θ characteristic shows errors between the measurement values and theoretical values and M represents the curvature of field in the main scanning direction and S represents the curvature of field in the sub-scanning direction.

A fourth embodiment will be described.

An optical beam scanning apparatus of the fourth embodiment has the surface inclination compensation function and has a constant scanning speed V=2·f·dθ/dt and the second optical system has a focal length in the main scanning direction f=135.5 mm. In such a condition, the second optical system is made with data as shown in Tables 7 and 8.

TABLE 7

|   | R1 | R2 | Dis | N | SURFACE |
|---|---|---|---|---|---|
| i = 1 | INF | 44 | 3.00 | 1.51118 | CYLINDRICAL |
| 2 | INF | INF | 84.09 | 1 | FLAT |
| 3 | INF | INF | 50.51 | $-1$ | FLAT REFLECTION |
| 4 | 91.36 | 91.36 | 7.00 | 1.51922 | YTO |
| 5 | 30.90 | 44.42 | 20.00 | 1 | YTO ASPHERIC |
| 6 | 465.85 | $-94.14$ | 5.00 | 1.51922 | YTO |
| 7 | $-37.20$ | $-26.95$ | 76.83 | 1 | YTO ASPHERIC |
| 8 | $-57.34$ | 61.78 | 6.34 | 1.51922 | YTO |
| 9 | $-59.41$ | $-116.74$ | 84.32 | 1 | YTO ASPHERIC |

TABLE 8

|   | i = 5 | i = 7 | i = 9 |
|---|---|---|---|
| K | $-0.52616853 \times 10^{15}$ | $-0.28110828 \times 10^{19}$ | $-0.74074514 \times 10^{22}$ |
| H | 0.0323579 | $-0.0268844$ | $-0.0168334$ |
| A | $-0.112575 \times 10^{-5}$ | $0.162315 \times 10^{-5}$ | $-0.980293 \times 10^{-5}$ |
| B | $-0.964882 \times 10^{-9}$ | $0.722402 \times 10^{-9}$ | $0.140816 \times 10^{-9}$ |
| C | $0.150480 \times 10^{-11}$ | $-0.577794 \times 10^{-12}$ | $-0.235565 \times 10^{-13}$ |
| D | $-0.647266 \times 10^{-15}$ | $0.144896 \times 10^{-15}$ | $0.131108 \times 10^{-17}$ |

FIG. 13A is a plan view of the third optical system and a polygon mirror of the fourth embodiment. FIG. 13B is a side view of the second optical system and a polygon mirror of the fourth embodiment. FIG. 14 is a graphic diagram of aberration characteristics (a curvature of an image plane of the beam spot and 2·f·θ characteristic). In FIG. 14, the 2·f·θ characteristic shows errors between the measurement values and theoretical values and M represents the curvature of field in the main scanning direction and S represents the curvature of field in the sub-scanning direction.

A fifth embodiment will be described.

An optical beam scanning apparatus of the fifth embodiment has the surface inclination compensation function and has a constant scanning speed V=2·f·dθ/dt and the second optical system has a focal length in the main scanning direction f=135.5 mm. In such a condition, the second optical system is made data as shown in Tables 9 and 10.

TABLE 9

|   | R1 | R2 | Dis | N | SURFACE |
|---|---|---|---|---|---|
| i = 1 | INF | 44 | 3.00 | 1.51118 | CYLINDRICAL |
| 2 | INF | INF | 84.09 | 1 | FLAT |
| 3 | INF | INF | 47.78 | $-1$ | FLAT REFLECTION |
| 4 | 88.09 | $-73.96$ | 10.00 | 1.51922 | YTO |
| 5 | 31.62 | $-34.82$ | 23.23 | 1 | YTO ASPHERIC |
| 6 | INF | INF | 5.00 | 1.51922 | FLAT |
| 7 | $-36.13$ | $-66.24$ | 91.70 | 1 | YTO ASPHERIC |
| 8 | $-61.74$ | 52.89 | 3.00 | 1.51922 | YTO ASPHERIC |
| 9 | $-65.68$ | $-149.61$ | 69.29 | 1 | YTO ASPHERIC |

TABLE 10

|   | i = 5 | i = 7 | i = 8 | i = 9 |
|---|---|---|---|---|
| K | $-0.526169 \times 10^{15}$ | $-0.281108 \times 10^{19}$ | $-0.308225$ | $-0.740745 \times 10^{22}$ |
| H | 0.031625 | $-0.0276784$ | $-0.0161971$ | $-0.0152264$ |
| A | $-0.159016 \times 10^{-5}$ | $0.212937 \times 10^{-5}$ | $0.22356 \times 10^{-5}$ | $-0.761268 \times 10^{-5}$ |
| B | $0.509333 \times 10^{-9}$ | $0.188338 \times 10^{-11}$ | $-0.858872 \times 10^{-10}$ | $0.120668 \times 10^{-9}$ |
| C | $-0.988888 \times 10^{-13}$ | $-0.364709 \times 10^{-13}$ | $0.525485 \times 10^{-13}$ | $-0.172467 \times 10^{-13}$ |

TABLE 10-continued

|   | i = 5 | i = 7 | i = 8 | i = 9 |
|---|---|---|---|---|
| D | $0.219169 \times 10^{-16}$ | $-0.372641 \times 10^{-17}$ | $-0.102300 \times 10^{-15}$ | $0.623377 \times 10^{-15}$ |

FIG. 15A is a plan view of the third optical system and a polygon mirror of the fifth embodiment. FIG. 15B is a side view of the second optical system and a polygon mirror of the fifth embodiment. FIG. 16 is a graphic diagram of aberration characteristics (a curvature of field and a 2·f·θ characteristic). In FIG. 16, the 2·f·θ characteristic shows errors between the measurement values and theoretical values and M represents the curvature field in the main scanning direction and S represents the curvature of field in the sub-scanning direction.

A sixth embodiment will be described.

Figure 18:
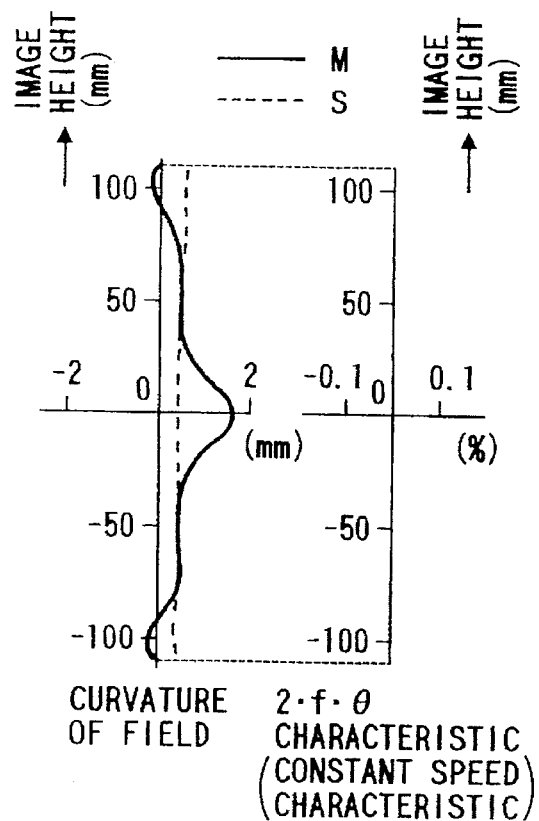
FIG. 18 is a graphic diagram of aberration characteristics of the sixth embodiment.

An optical beam scanning apparatus of the sixth embodiment has the surface inclination compensation function and has a constant scanning speed V=2·f·dθ/dt and the second optical system has a focal length in the main scanning direction f=135.5 mm. In such a condition, the second optical system is made data as shown in Tables 11 and 12.

aberration characteristics (a curvature of field and 2·f·θ characteristic). In FIG. 18, the 2·f·θ characteristic shows errors between the measurement values and theoretical values and M represents the curvature of field in the main scanning direction and S represents the curvature of field in the sub-scanning direction.

A seventh embodiment will be described.

An optical beam scanning apparatus of the seventh embodiment has the surface inclination compensation function and has a constant scanning speed V=1.8·f·dθ/dt and the second optical system has a focal length in the main scanning direction f=135.5 mm. In such a condition, the second optical system is made data as shown in Tables 13 and 14.

TABLE 13

|   | R1 | R2 | Dis | N | SURFACE |
|---|---|---|---|---|---|
| i = 1 | INF | 44 | 3.00 | 1.51118 | CYLINDRICAL |
| 2 | INF | INF | 84.09 | 1 | FLAT |
| 3 | INF | INF | 50.73 | -1 | FLAT REFLECTION |
| 4 | 96.64 | -75.71 | 8.00 | 1.51922 | YTO |
| 5 | 31.23 | -35.04 | 17.54 | 1 | YTO ASPHERIC |
| 6 | 502.37 | 279.61 | 5.00 | 1.51922 | YTO |
| 7 | -35.81 | -80.76 | 94.26 | 1 | YTO ASPHERIC |
| 8 | -62.39 | 47.93 | 3.00 | 1.51922 | YTO ASPHERIC |
| 9 | -66.95 | -137.14 | 62.16 | 1 | YTO ASPHERIC |

TABLE 14

|   | i = 5 | i = 7 | i = 8 | i = 9 |
|---|---|---|---|---|
| K | $-0.526169 \times 10^{15}$ | $-0.281108 \times 10^{19}$ | $-0.183157$ | $-0.740745 \times 10^{22}$ |
| H | $0.0320224$ | $-0.0279225$ | $-0.016029$ | $-0.014937$ |
| A | $-0.158861 \times 10^{-5}$ | $0.19297 \times 10^{-5}$ | $0.144602 \times 10^{-6}$ | $-0.760698 \times 10^{-6}$ |
| B | $-0.598736 \times 10^{-10}$ | $0.264465 \times 10^{-9}$ | $-0.16643 \times 10^{-10}$ | $0.134137 \times 10^{-9}$ |
| C | $0.369861 \times 10^{-12}$ | $-0.178211 \times 10^{-12}$ | $0.448273 \times 10^{-13}$ | $-0.184339 \times 10^{-13}$ |
| D | $-0.10367 \times 10^{-15}$ | $0.106352 \times 10^{-15}$ | $-0.800529 \times 10^{-17}$ | $0.674499 \times 10^{-15}$ |

TABLE 11

|   | R1 | R2 | Dis | N | SURFACE |
|---|---|---|---|---|---|
| i = 1 | INF | 44 | 3.00 | 1.51118 | CYLINDRICAL |
| 2 | INF | INF | 84.09 | 1 | FLAT |
| 3 | INF | INF | 46.91 | -1 | FLAT REFLECTION |
| 4 | 93.46 | -74.40 | 10.00 | 1.51922 | YTO |
| 5 | 31.31 | -35.93 | 21.72 | 1 | YTO ASPHERIC |
| 6 | 636.20 | 288.78 | 5.33 | 1.51922 | YTO |
| 7 | -36.82 | -82.77 | 84.11 | 1 | YTO ASPHERIC |
| 8 | -59.55 | 56.41 | 6.75 | 1.51922 | YTO ASPHERIC |
| 9 | -63.53 | -162.76 | 75.18 | 1 | YTO ASPHERIC |

FIG. 19A is a plan view of the second optical system and a polygon mirror of the seventh embodiment. FIG. 19B is a side view of the second optical system and a polygon mirror of the seventh embodiment. FIG. 20 is a graphic diagram of aberration characteristics (a curvature of field and 1.8·f·θ characteristic). In FIG. 20, the 1.8·f·θ characteristic shows errors between the measurement values and theoretical values and M represents the curvature of field in the main scanning direction and S represents the curvature of field in the sub-scanning direction.

In the above-mentioned second to seventh embodiments, in order to compensate the surface inclination, the lenses of the second optical system 14 has different optical powers in

TABLE 12

|   | i = 5 | i = 7 | i = 8 | i = 9 |
|---|---|---|---|---|
| K | $-0.526169 \times 10^{15}$ | $-0.28111 \times 10^{16}$ | $-0.12255$ | $-0.740745 \times 10^{22}$ |
| H | $0.0319387$ | $-0.0271556$ | $-0.0167929$ | $-0.0157404$ |
| A | $-0.154098 \times 10^{-5}$ | $0.195272 \times 10^{-5}$ | $0.243511 \times 10^{-6}$ | $-0.754347 \times 10^{-6}$ |
| B | $-0.327968 \times 10^{-10}$ | $0.277643 \times 10^{-9}$ | $0.188613 \times 10^{-11}$ | $0.132979 \times 10^{-9}$ |
| C | $0.532476 \times 10^{-12}$ | $-0.174039 \times 10^{-12}$ | $0.479387 \times 10^{-13}$ | $-0.192442 \times 10^{-13}$ |
| D | $-0.223969 \times 10^{-15}$ | $0.282313 \times 10^{-17}$ | $-0.743412 \times 10^{-17}$ | $0.7650 \times 10^{-13}$ |

Figure 17A:
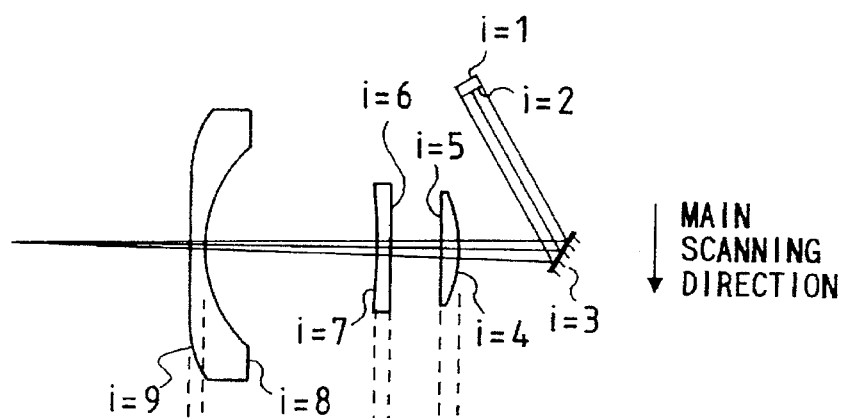
FIG. 17A is a plan view of a second optical system and a polygon mirror of a sixth embodiment.
Figure 17B:
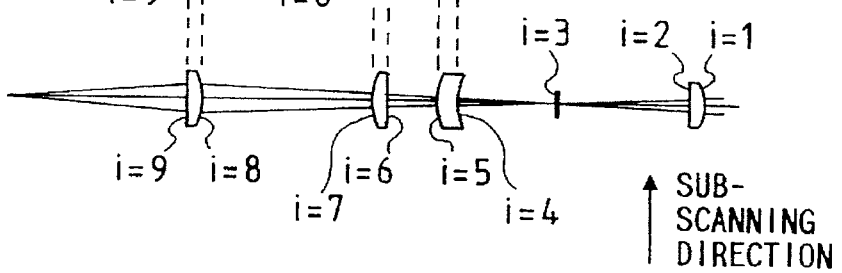
FIG. 17B is a side view of the second optical system and a polygon mirror of the sixth embodiment.

FIG. 17A is a plan view of the second optical system and a polygon mirror of the sixth embodiment. FIG. 17B is a side view of the second optical system and a polygon mirror of the sixth embodiment. FIG. 18 is a graphic diagram of the main and sub-scanning directions. Therefore, all of lenses of the second optical system 14 cannot be formed with rotation symmetrical lenses. Therefore, there are some surfaces where optical powers in the main scanning and sub-scanning directions are different each other. This fact makes the processing of the lenses difficult and increases a cost of the second optical system and causes decrease in the accuracy. In order to make the processing of lenses easier, the second optical system is formed with lenses having toric surfaces including a rotation symmetric aspheric surface and a spherical surface or having one toric aspheric surface and other surfaces formed with rotation symmetric aspheric surfaces.

An eighth embodiment will be described.

Figures 21A, 21B:
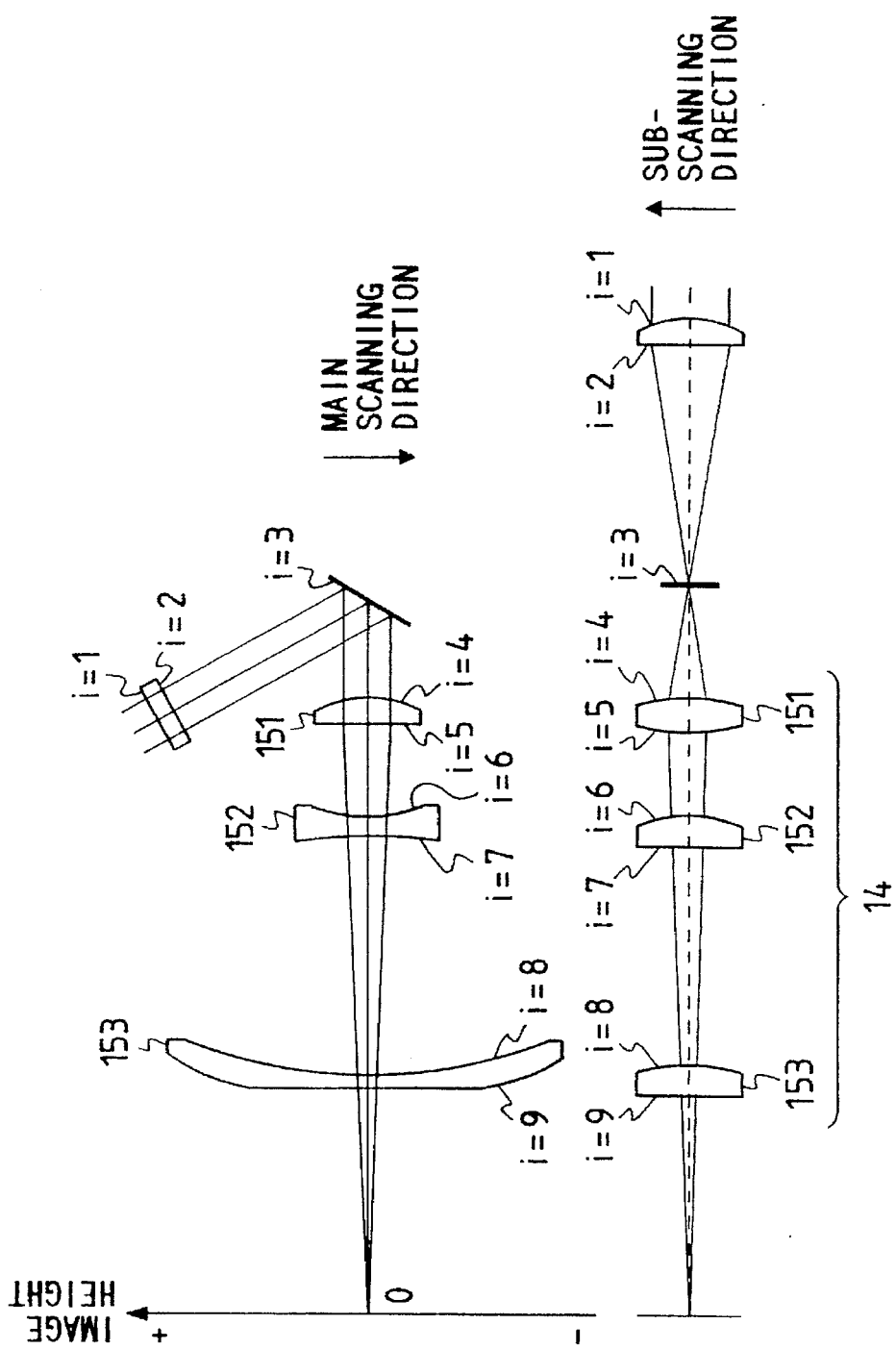
FIG. 21A is a plan view of a second optical system and a polygon mirror of an eighth embodiment.
FIG. 21B is a side view of the second optical system and a polygon mirror of the eighth embodiment.
Figure 22A:
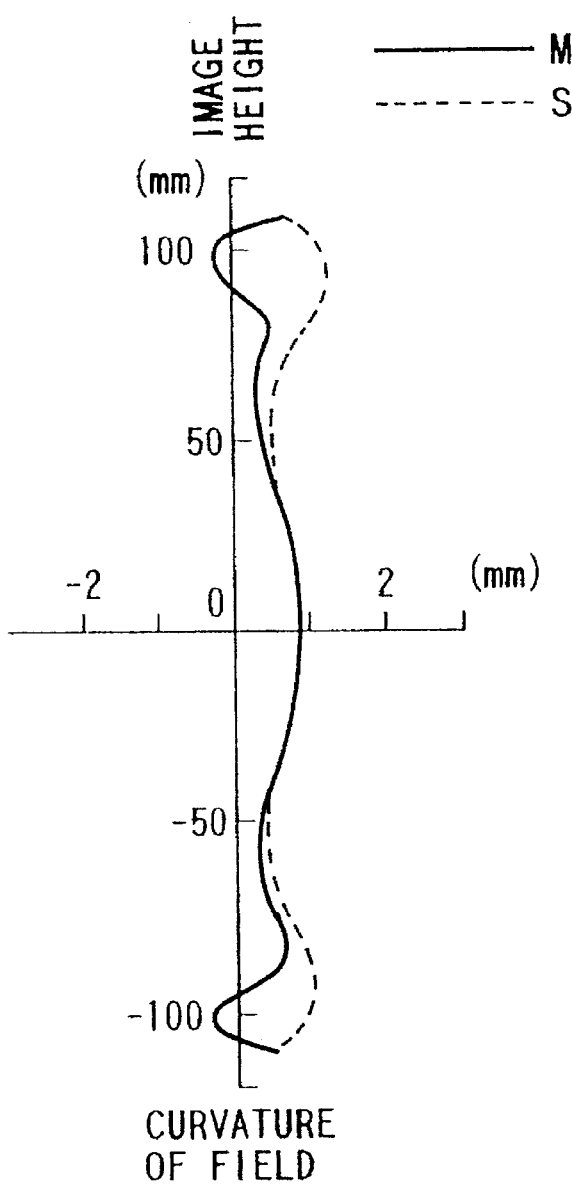
FIG. 22 is a graphic diagram of aberration characteristics of the eighth embodiment.
Figure 22B:
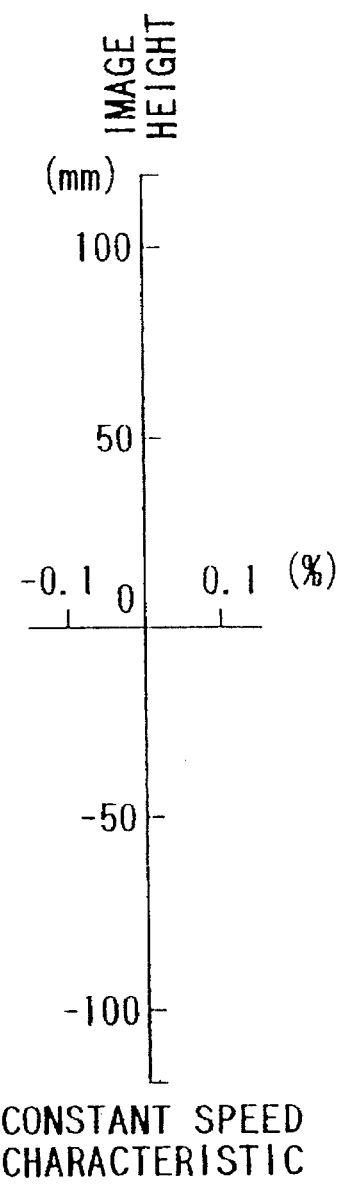

FIG. 21A is a plan view of a second optical system and a polygon mirror of the eighth embodiment. FIG. 21B is a side view of the second optical system and a polygon mirror of the eighth embodiment. FIG. 22 is a graphic diagram of aberration characteristics, that is, a curvature of an image plane of the beam spot and a constant speed characteristic.

Lenses 151 to 153 having forth to ninth surfaces are formed as shown in TABLE 15.

TABLE 15

|   | R1 | R2 | Dis | N | SURFACE |
|---|---|---|---|---|---|
| i = 1 | INF |  | 44.00 | 3.00 1.51118 | CYLINDRICAL |
| 2 | INF | INF | 84.09 | 1 | FLAT |
| 3 | INF | INF | 27.36 | −1 | FLAT REFLECTION |
| 4 | 47.29 |  | 7.69 | 1.51922 | ROTATION SYM ASPHERIC |
| 5 | 24.74 |  | 20.07 | 1 | ROTATION SYM ASPHERIC |
| 6 | −60.77 | 35.11 | 8.24 | 1.51922 | X TORIC |
| 7 | −24.51 |  | 77.65 | 1 | ROTATION SYM ASPHERIC |
| 8 | −150.78 | 43.24 | 3.50 | 1.51922 | Y TORIC |
| 9 | −152.98 |  | 85.50 | 1 | ROTATION SYM ASPHERIC |

The lenses 151, 152, and 153 are formed with rotation symmetric (SYM) aspheric surfaces, a YTO surface, and a XTO surface. In the eighth embodiment, f=135.5 mm, F-number=30, and λ=780 nm.

The aspheric surface coefficients of the fourth, fifth, seventh, and ninth surfaces in the lenses 151, 152, 153 are as shown in TABLE 16

TABLE 16

|   | i = 4 | i = 5 | i = 7 | i = 9 |
|---|---|---|---|---|
| K | −0.571859 | −0.423669 × $10^{23}$ | −0.310058 × $10^{17}$ | −0.16074 × $10^{24}$ |
| H | 0.0211461 | 0.0404203 | −0.0407996 | −0.0065368 |
| A | −0.79664 × $10^{-5}$ | −0.55384 × $10^{-5}$ | 0.757418 × $10^{-5}$ | −0.80257 × $10^{-6}$ |
| B | −0.59989 × $10^{-3}$ | 0.27202 × $10^{-8}$ | 0.111333 × $10^{-8}$ | 0.83575 × $10^{-10}$ |
| C | 0.15095 × $10^{-13}$ | 0.54293 × $10^{-11}$ | −0.30045 × $10^{-11}$ | −0.192442 × $10^{-13}$ |
| D | 0.90381 × $10^{-14}$ | 0.34338 × $10^{-13}$ | 0.37514 × $10^{-15}$ | 0.11876 × $10^{-13}$ |

TABLE 17 shows a relation between the incident angle θ and the emission angle α with respect to the image height (the height of image).

TABLE 17

| H mm | θ° | α° | H mm | θ° | α° |
|---|---|---|---|---|---|
| 108 | 22.83 | 26.07 | −5 | 1.06 | 1.64 |
| 100 | 21.14 | 25.31 | −10 | 2.11 | 3.27 |
| 80 | 16.91 | 22.32 | −15 | 3.17 | 4.89 |
| 65 | 13.74 | 19.18 | −20 | 4.23 | 6.49 |
| 50 | 10.57 | 15.41 | −35 | 7.40 | 11.14 |
| 35 | 7.40 | 11.13 | −50 | 10.57 | 15.44 |

TABLE 17-continued

| H mm | θ° | α° | H mm | θ° | α° |
|---|---|---|---|---|---|
| 20 | 4.23 | 6.49 | −65 | 13.74 | 19.23 |
| 15 | 3.17 | 4.88 | −80 | 16.91 | 22.41 |
| 10 | 2.11 | 3.27 | −100 | 21.14 | 25.44 |
| 5 | 1.06 | 1.64 | −108 | 22.83 | 26.23 |
| 0 | 0 | 0 |  |  |  |

In FIG. 22, M represents the curvature of field and the constant speed characteristic in the main scanning direction and S represents the curvature of field in the sub-scanning direction. The constant speed characteristic is given by constant speed characteristic value (%)=(actual scanning position−a theoretical position)/(theoretical position)×100.

An ninth embodiment will be described.

Figures 23A, 23B:
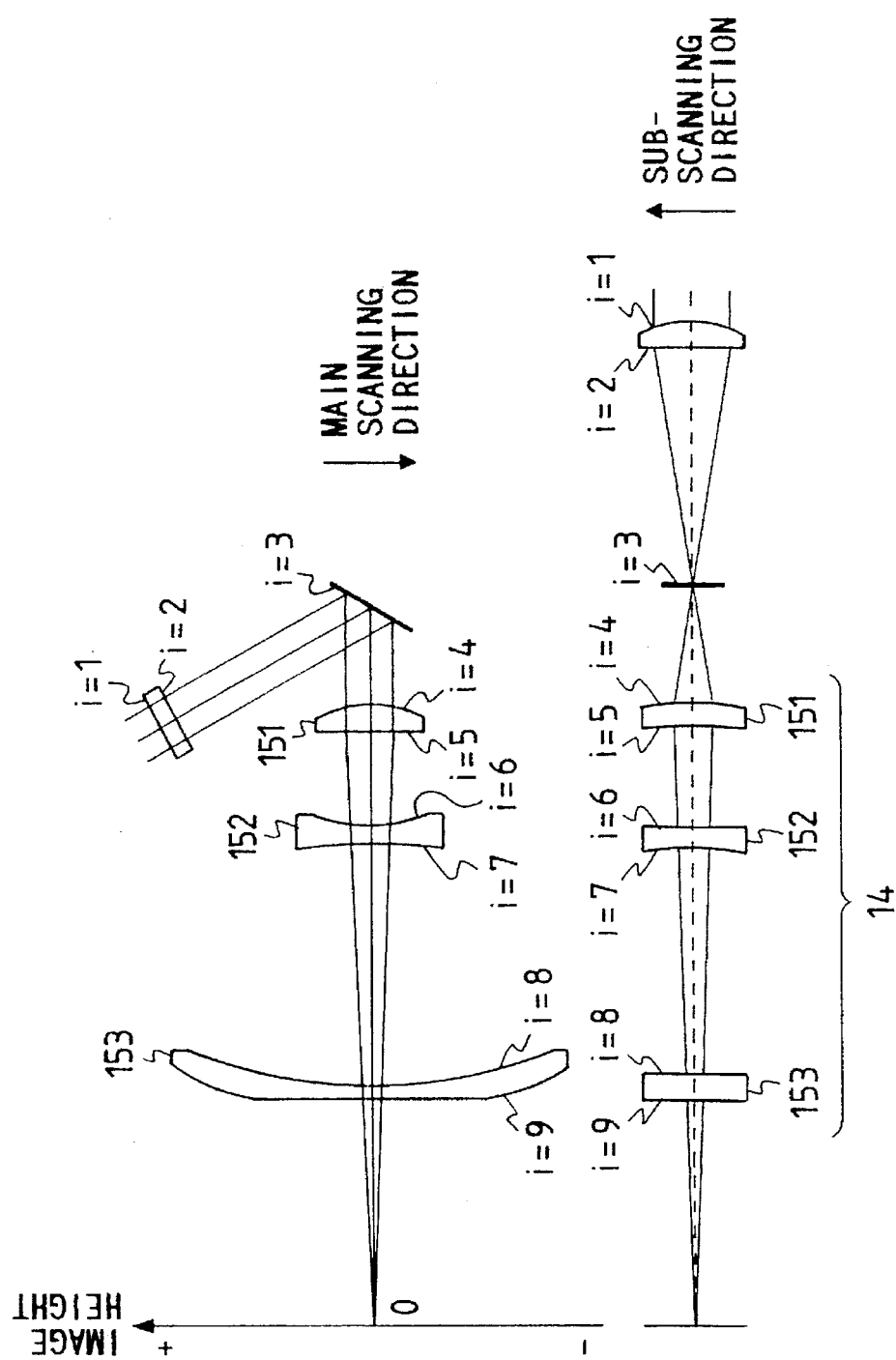
FIG. 23A is a plan view of a second optical system and a polygon mirror of a ninth embodiment.
FIG. 23B is a side view of the second optical system and a polygon mirror of the ninth embodiment.

FIG. 23A is a plan view of a second optical system and a polygon mirror of a ninth embodiment. FIG. 23B is a side view of the second optical system and a polygon mirror of the ninth embodiment. FIG. 24 is a graphic diagram of aberration characteristics, that is, a curvature of field and a constant speed characteristic.

Lenses 151 to 153 having forth to ninth surfaces are formed as shown in TABLE 18.

TABLE 18

|   | R1 | R2 | Dis | N | SURFACE |
|---|---|---|---|---|---|
| i = 1 | INF |  | 44.00 | 3.00 1.51118 | CYLINDRICAL |
| 2 | INF | INF | 84.09 | 1 | FLAT |
| 3 | INF | INF | 25.11 | −1 | FLAT REFLECTION |
| 4 | 71.31 |  | 5.02 | 1.51922 | ROTATION SYM ASPHERIC |
| 5 | 28.99 |  | 21.72 | 1 | ROTATION SYM ASPHERIC |
| 6 | −177.91 | 21.69 | 5.60 | 1.51922 | XTO ASPHERIC |
| 7 | −31.76 |  | 108.67 | 1 | ROTATION SYM ASPHERIC |

TABLE 18-continued

|   | R1 | R2 | Dis | N | SURFACE |
|---|---|---|---|---|---|
| 8 | −112.97 |  | 5.84 | 1.51922 | ROTATION SYM ASPHERIC |
| 9 | −85.36 |  | 68.04 | 1 | ROTATION SYM ASPHERIC |

The lenses 151, 152, and 153 are formed with rotation symmetric aspheric surfaces and a XTO aspheric surface. In the ninth embodiment, f=135.5 mm, F-number=30, and λ=780 nm.

The aspheric surface coefficients of the fourth, fifth, seventh, and ninth surfaces in the lenses 151, 152, 153 are as shown in TABLE 19

TABLE 19

|   | i = 4 | i = 5 | i = 6 | i = 7 |
|---|---|---|---|---|
| K | 5.148226 | $-0.4237 \times 10^{23}$ | 15.188475 | $-0.310058 \times 10^{17}$ |
| H | 0.014023 | 0.0344946 | 0.056208 | 0.0314861 |
| A | $0.2692 \times 10^{-5}$ | $0.2151 \times 10^{-5}$ | $-0.21111 \times 10^{-3}$ | $0.294236 \times 10^{-5}$ |
| B | $0.1498 \times 10^{-7}$ | $0.1754 \times 10^{-7}$ | $-0.55518 \times 10^{-5}$ | $-0.793246 \times 10^{-9}$ |
| C | $-0.3050 \times 10^{-11}$ | $0.1470 \times 10^{-10}$ | $0.18519 \times 10^{-6}$ | $-0.39822 \times 10^{-12}$ |
| D | $0.1419 \times 10^{-15}$ | $-0.1223 \times 10^{-13}$ | $-0.8991 \times 10^{-14}$ | $0.99750 \times 10^{-15}$ |

|   | i = 8 | i = 9 |
|---|---|---|
| K | 0.716063 | $-0.160744 \times 10^{23}$ |
| H | $-0.0088519$ | $-0.011715$ |
| A | $-0.29877 \times 10^{-7}$ | $-0.559654 \times 10^{-6}$ |
| B | $-0.25181 \times 10^{-10}$ | $0.28438 \times 10^{-10}$ |
| C | $-0.88756 \times 10^{-15}$ | $-0.40582 \times 10^{-14}$ |
| D | $-0.75371 \times 10^{-18}$ | $-0.17056 \times 10^{-13}$ |

TABLE 20 shows a relation between the incident angle θ and the emission angle α with respect to the height of image.

TABLE 20

| H mm | θ° | α° | H mm | θ° | α° |
|---|---|---|---|---|---|
| 108 | 22.83 | 27.69 | -5 | 1.06 | 1.74 |
| 100 | 21.14 | 26.77 | -10 | 2.11 | 3.48 |
| 80 | 6.91 | 23.60 | -15 | 3.17 | 5.21 |
| 65 | 13.74 | 20.32 | -20 | 4.23 | 6.91 |
| 50 | 10.57 | 16.36 | -35 | 7.40 | 11.85 |
| 35 | 7.40 | 11.84 | -50 | 10.57 | 16.39 |
| 20 | 4.23 | 6.91 | -65 | 13.74 | 20.37 |
| 15 | 3.17 | 5.20 | -80 | 16.91 | 23.69 |
| 10 | 2.11 | 3.48 | -100 | 21.14 | 26.91 |
| 5 | 1.06 | 1.74 | -108 | 22.83 | 27.85 |
| 0 | 0 | 0 |  |  |  |

An tenth embodiment will be described.

Figures 25A, 25B:
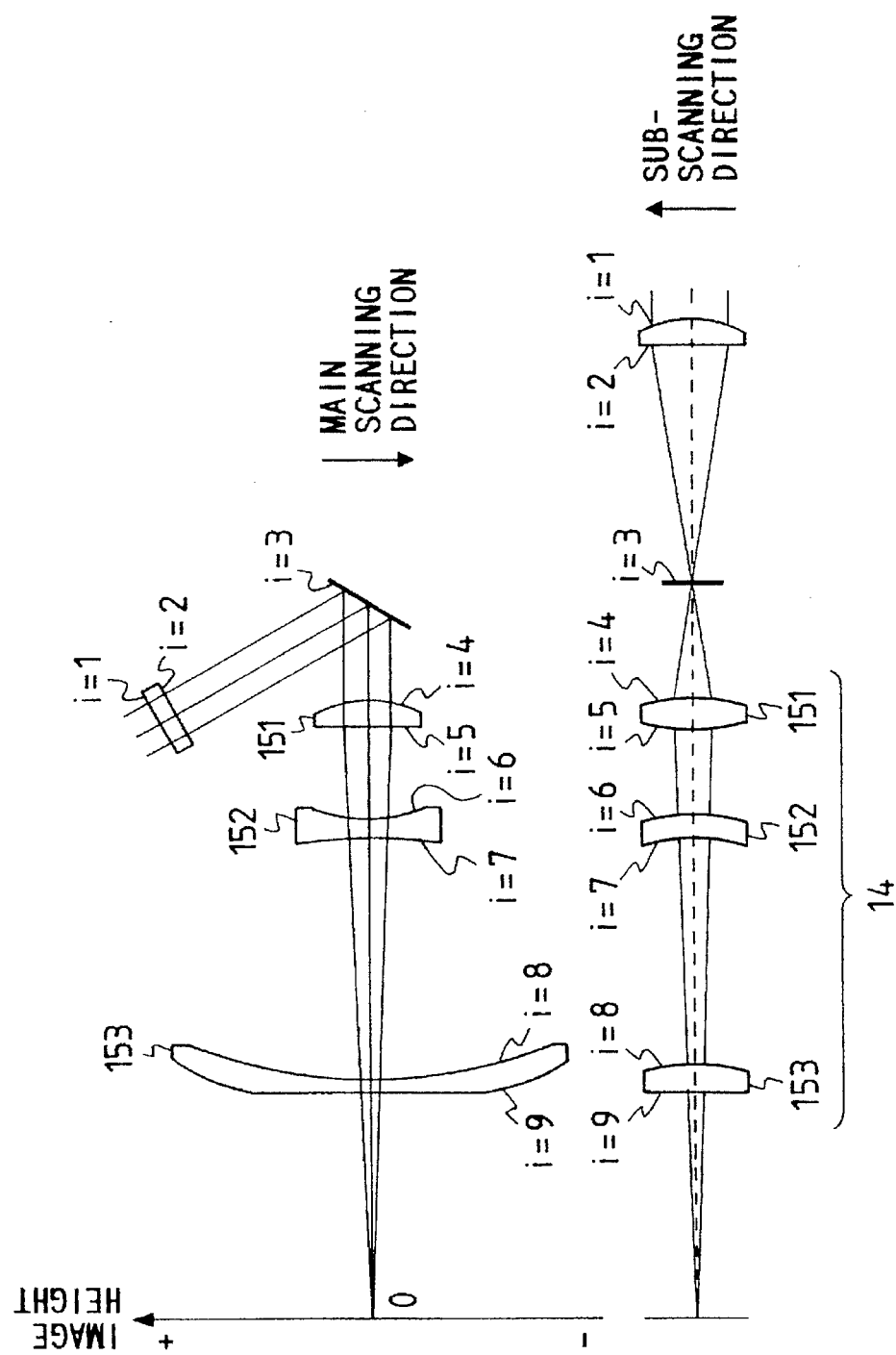
FIG. 25A is a plan view of a second optical system and a polygon mirror of a tenth embodiment.
FIG. 25B is a side view of the second optical system and a polygon mirror of the tenth embodiment.
Figure 26A:
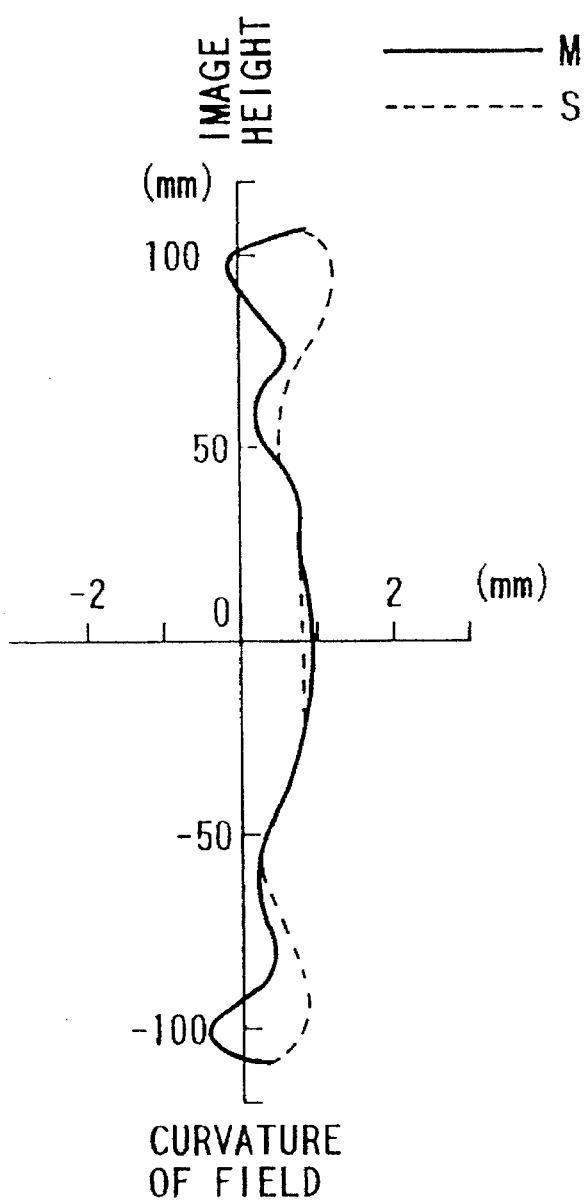
FIG. 26 is a graphic diagram of aberration characteristics of the tenth embodiment.
Figure 26B:
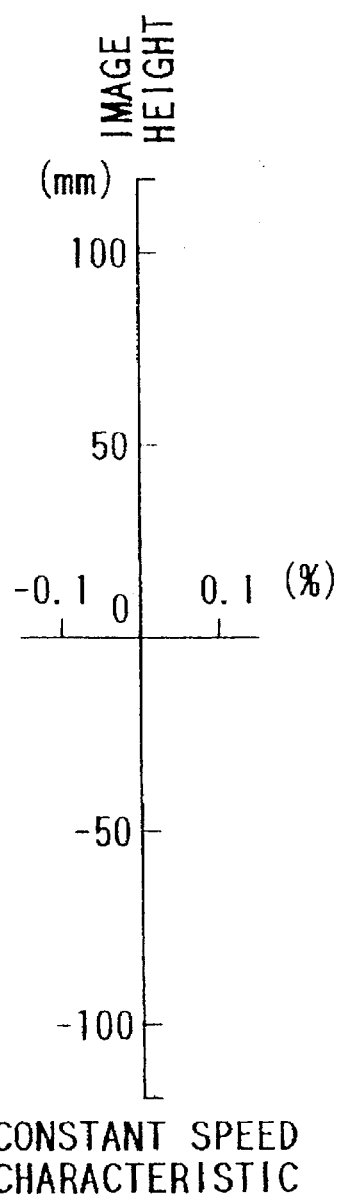
Figure 27:
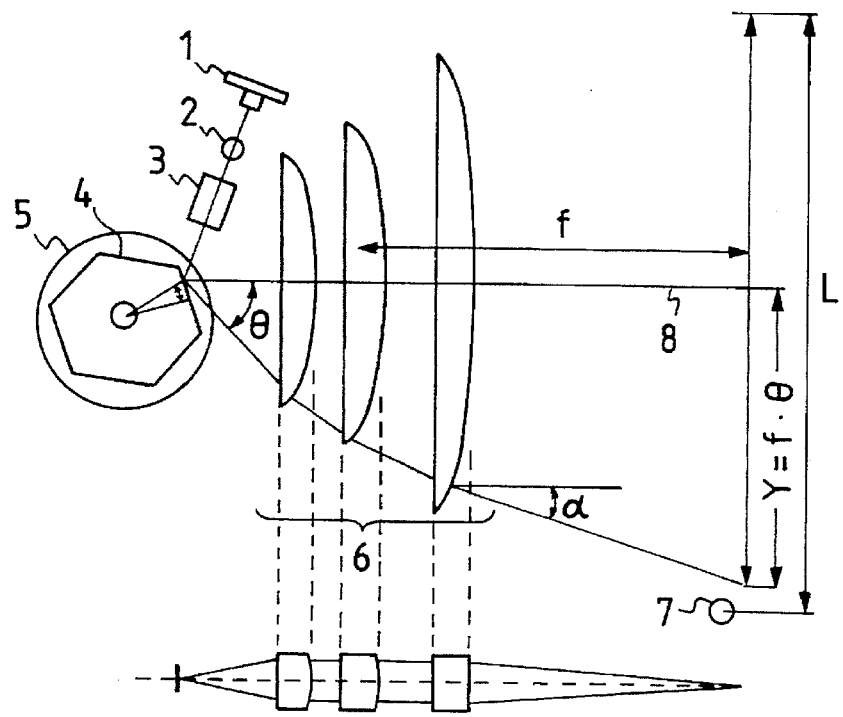
FIG. 27 is a schematic plan view of a prior art optical beam scanning apparatus.
Figure 28:
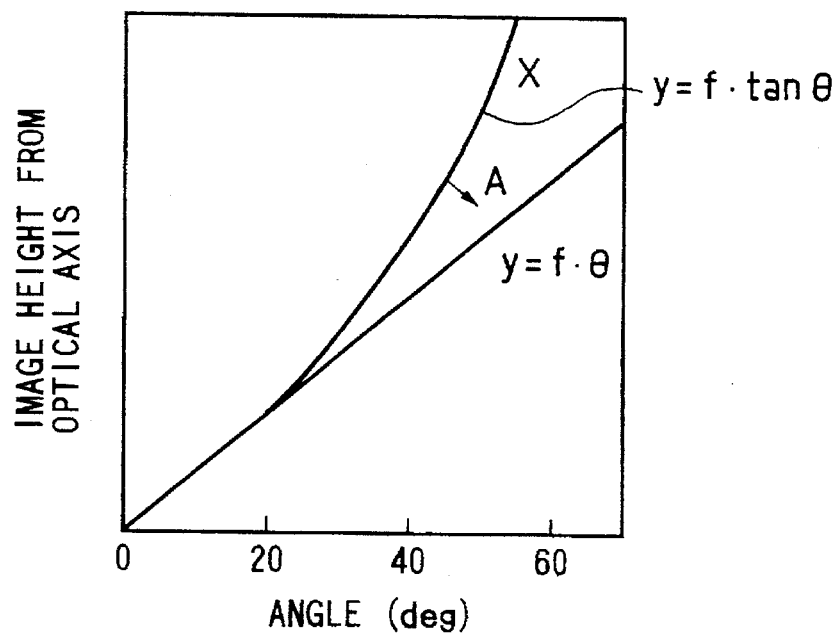
FIG. 28 is a graphic diagram of aberration characteristics of a prior art general lens and a prior art fθ lens.

FIG. 25A is a plan view of a second optical system and a polygon mirror of a tenth embodiment. FIG. 25B is a side view of the second optical system and a polygon mirror of the tenth embodiment. FIG. 26 is a graphic diagram of aberration characteristics, that is, a curvature of an image plane of the beam spot and a constant speed characteristic.

Lenses 151 to 153 having forth to ninth surfaces are formed as shown in TABLE 21.

TABLE 21

|   | R1 | R2 | Dis | N | SURFACE |
|---|---|---|---|---|---|
| i = 1 | INF | 44 | 3.00 | 1.51362 | CYLINDRICAL |
| 2 | INF | INF | 83.69 | 1 | FLAT |

TABLE 21-continued

|   | R1 | R2 | Dis | N | SURFACE |
|---|---|---|---|---|---|
| 3 | INF | INF | 27.43 | -1 | FLAT REFLECTION |
| 4 | 47.33 |  | 7.56 | 1.52180 | ROTATION SYM ASPHERIC |
| 5 | 24.79 |  | 20.00 | 1 | ROTATION SYM ASPHERIC |
| 6 | -60.63 | 35.41 | 8.22 | 1.52180 | XTO |
| 7 | -24.55 |  | 78.39 | 1 | ROTATION SYM ASPHERIC |
| 8 | -151.32 | 40.05 | 3.50 | 1.52180 | YTO |
| 9 | -153.47 |  | 84.90 | 1 | ROTATION SYM ASPHERIC |

The lenses 151, 152, and 153 are formed with rotation symmetric aspheric surfaces and a YTO aspheric surface and a XTO aspheric surface. In the tenth embodiment, f=135.5 mm, F-number=30, and λ=780 nm.

The aspheric surface coefficients of the fourth, fifth, seventh, and ninth surfaces in the lenses 151, 152, 153 are as shown in TABLE 22

TABLE 22

|   | i = 4 | i = 5 | i = 7 | i = 9 |
|---|---|---|---|---|
| K | -0.647613 | $-0.423669 \times 10^{23}$ | $-0.310058 \times 10^{17}$ | $-0.16074 \times 10^{24}$ |
| H | 0.0211282 | 0.0403388 | -0.0407331 | -0.0065159 |
| A | $-0.89142 \times 10^{-6}$ | $-0.576912 \times 10^{-5}$ | $0.760510 \times 10^{-5}$ | $-0.79092 \times 10^{-6}$ |
| B | $-0.83716 \times 10^{-9}$ | $0.246177 \times 10^{-8}$ | $0.112484 \times 10^{-3}$ | $0.82050 \times 10^{-10}$ |
| C | $0.14519 \times 10^{-10}$ | $0.49160 \times 10^{-11}$ | $-0.30156 \times 10^{-11}$ | $-0.11776 \times 10^{-13}$ |
| D | $0.93464 \times 10^{-14}$ | $0.33695 \times 10^{-13}$ | $0.34537 \times 10^{-15}$ | $0.13435 \times 10^{-13}$ |

TABLE 23 shows a relation between the incident angle θ and the emission angle α with respect to the height of image.

TABLE 23

| H mm | θ° | α° | H mm | θ° | α° |
|---|---|---|---|---|---|
| 108 | 22.83 | 26.06 | -5 | 1.06 | 1.64 |
| 100 | 21.14 | 25.31 | -10 | 2.11 | 3.27 |
| 80 | 16.91 | 22.34 | -15 | 3.17 | 4.90 |
| 65 | 13.74 | 19.20 | -20 | 4.23 | 6.50 |

TABLE 23-continued

| H mm | θ° | α° | H mm | θ° | α° |
| --- | --- | --- | --- | --- | --- |
| 50 | 10.57 | 15.43 | −35 | 7.40 | 11.16 |
| 35 | 7.40 | 11.15 | −50 | 10.57 | 15.46 |
| 20 | 4.23 | 6.50 | −65 | 13.74 | 19.25 |
| 15 | 3.17 | 4.89 | −80 | 16.91 | 22.42 |
| 10 | 2.11 | 3.27 | −100 | 21.14 | 25.44 |
| 5 | 1.06 | 1.64 | −108 | 22.83 | 26.22 |
| 0 | 0 | 0 | | | |

In embodiments of this inventions, a collimated beam is inputted into the first optical system 12. However, a lens system having a collimater lens and a cylindrical lens functions can replace the first optical system 12.

Moreover, the structure of the first optical system 12 is not limited to the structures mentioned above but the first optical system operates such that the laser beam emitted from the first optical system 12 is parallel in the main direction and in the sub-scanning direction it focus the beam near the deflection unit 13.

As mentioned, the optical bream scanning apparatus of this invention comprises a deflection unit 13 for deflecting an optical beam at a constant angular velocity and the second optical system for focusing the optical beam to form a beam spot on the surface of the recording medium and scanning the beam spot in the main scanning direction at a constant scanning speed, wherein assuming that the focal length of the optical lens system in the main scanning direction is f, the constant scanning speed of beam spot on the recording medium is larger than f·dθ/dt or the emission angle α is larger than the deflection angle θ. Therefore, the range of the deflection angle can be made small, so that the number of the surfaces of the polygon mirrors can be increased with the same size of the optical system. Accordingly, a high speed scanning with a small size optical beam scanner can be provided without increase in the rotational speed of the motor of the polygon mirror unit.

Moreover, the processing of lenses of the optical system can be made easier because the second optical system is formed with toric surfaces including a rotational symmetric aspheric surface and a spherical surface or because one surface is formed with a toric surface and other surface are formed with rotation symmetric aspheric surface. Therefore, this structure provides a high produciability, a high speed scanning with a high accuracy.

What is claimed is:

1. An optical beam scanning apparatus comprising:
an optical beam source for emitting an optical beam;
polygon mirror deflection means for deflecting said optical beam around a center line with a deflection angel Θ radians in a main scanning direction perpendicular to said center line at a constant angular velocity dΘ/dt; and
a lens system, having a focal length f from said main scanning direction, for focusing said optical beam on a recording plane perpendicular to said center line to form a beam spot and to scan said beam spot on said recording plane at a constant speed in said main scanning direction, wherein said lens system refracts said optical beam from said polygon mirror deflection means such that said constant speed is larger f·dΘ/dt.

2. An optical beam scanning apparatus as claimed in claim 1, further comprising a sub-scanning means for moving a recording medium in a sub-scanning direction perpendicular to said center line and said main scanning direction, a signal processing means for receiving a data signal and producing an image signal, and a modulation means for modulating said optical beam supplied to said deflecting means to record said image signal on said recording medium.

3. An optical beam scanning apparatus as claimed in claim 1, wherein said polygon mirror deflection means has a plurality of deflecting mirrors.

4. An optical beam scanning apparatus as claimed in claim 3, wherein said plurality of deflecting mirrors have an inclined angle against said recording plane and generates a positional offset in a sub-scanning direction perpendicular to said center line and said main scanning direction and said lens system has a compensation means for compensating said positional offset.

5. An optical beam scanning apparatus as claimed in claim 4, wherein said compensation means includes a plurality of refracting surfaces having toric surfaces including at least a rotation symmetric aspheric surface and at least a spherical surface.

6. An optical beam scanning apparatus as claimed in claim 4, wherein said compensation means includes a plurality of refracting surfaces and one of said plurality refracting surfaces has a toric surface having an aspheric surface and other refracting surfaces have rotation symmetric aspheric surfaces.

7. An optical beam scanning apparatus as claimed in claim 4, further comprising a second lens system for shaping and directing said optical beam from said optical beam source to said deflection means.

8. An optical beam scanning apparatus as claimed in claim 7, wherein said second lens system comprises a collimating lens unit for collimating said optical beam from said optical beam source in said main direction and for focusing said optical beam around said deflection means in said sub-scanning direction.

9. An optical beam scanning apparatus comprising:
an optical beam source for emitting an optical beam;
polygon mirror deflection means for deflecting said optical beam around a center line with a deflection angle in a main scanning direction perpendicular to said center line; and
a lens system, having a focal length f from said main scanning direction, for emitting said optical beam with an emitting angle defined by said center line and focusing and forming said optical beam on a recording plane perpendicular to said center line at a constant speed in said main scanning direction, wherein said emitting angle is larger than said deflecting angle.

10. An optical beam scanning apparatus as claimed in claim 9, wherein said polygon mirror deflection means has a plurality of deflecting mirrors.

11. An optical beam scanning apparatus as claimed in claim 10, wherein said plurality of deflecting mirrors have an inclined angle against said recording plane and generates a positional offset in a sub-scanning direction perpendicular to said center line and said main scanning direction and said lens system has a compensation means for compensating said positional offset.

12. An optical beam scanning apparatus as claimed in claim 11, wherein said compensation means includes a plurality of refracting surfaces and one of said plurality refracting surfaces has a toric surface having an aspheric surface and other refracting surfaces have rotation symmetric aspheric surfaces.

13. An optical beam scanning apparatus as claimed in claim 11, wherein said compensation means includes a plurality of refracting surfaces having toric surfaces including at least a rotation symmetric aspheric surface and at least a spherical surface.

14. An optical beam scanning apparatus as claimed in claim 9, further comprising a second lens system for shaping and directing said optical beam from said optical beam source to said deflection means.

15. An optical beam scanning apparatus as claimed in claim 14, wherein said second lens system comprises a collimating lens unit for collimating said optical beam from said optical beam source in said main direction and for focusing said optical beam around said deflection means in a sub-scanning direction perpendicular to said center line and said main direction.

16. An optical beam scanning apparatus as claimed in claim 9, further comprising a sub-scanning means for moving a recording medium in a sub-scanning direction perpendicular to said center line and said main scanning direction, a signal processing means for receiving a data signal and producing an image signal, and a modulation means for modulating said optical beam supplied to said deflecting means to record said-image signal on said recording medium.

* * * * *